(12) United States Patent
Bae et al.

(10) Patent No.: US 9,638,947 B2
(45) Date of Patent: May 2, 2017

(54) DISPLAY DEVICE INCLUDING A GROOVE PATTERNED LOOF LAYER AND MANUFACTURING METHOD THEREOF

(71) Applicant: Samsung Display Co., Ltd., Yongin, Gyeonggi-Do (KR)

(72) Inventors: Kwang Soo Bae, Yongin-si (KR); Hae Ju Yun, Hwaseong-si (KR); Yong Seok Kim, Seoul (KR); Dae Ho Song, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 14/702,332

(22) Filed: May 1, 2015

(65) Prior Publication Data
US 2016/0111444 A1   Apr. 21, 2016

(30) Foreign Application Priority Data

Oct. 15, 2014  (KR) ........................ 10-2014-0139243

(51) Int. Cl.
*G02F 1/1333* (2006.01)
(52) U.S. Cl.
CPC ...... *G02F 1/133377* (2013.01); *G02F 1/1333* (2013.01); *G02F 1/133371* (2013.01)
(58) Field of Classification Search
None
See application file for complete search history.

(56) References Cited

U.S. PATENT DOCUMENTS

| 6,466,296 | B1* | 10/2002 | Yamada | G02F 1/13334 |
| | | | | 349/130 |
| 7,570,333 | B2 | 8/2009 | Lu et al. | |
| 2008/0211974 | A1* | 9/2008 | Ikebe | G02F 1/134363 |
| | | | | 349/5 |
| 2012/0062448 | A1* | 3/2012 | Kim | G02F 1/133377 |
| | | | | 345/55 |
| 2013/0093985 | A1* | 4/2013 | Kang | G02F 1/133377 |
| | | | | 349/106 |

FOREIGN PATENT DOCUMENTS

| KR | 10-2009-0117242 | 11/2009 |
| KR | 10-2011-0103180 | 9/2011 |
| KR | 10-2013-0124827 | 11/2013 |
| KR | 10-2014-0003848 | 1/2014 |

* cited by examiner

*Primary Examiner* — Bilkis Jahan
(74) *Attorney, Agent, or Firm* — Innovation Counsel LLP

(57) ABSTRACT

An exemplary embodiment of the present inventive concept provides a display device including: an insulation substrate; a thin film transistor disposed on the substrate; a common electrode and a pixel electrode disposed on the thin film transistor to overlap each other with an insulating layer therebetween; a roof layer formed to be spaced apart from the pixel electrode with a microcavity therebetween; and a liquid crystal layer filling the microcavity. A lower portion of the roof layer includes a valley where a thickness of the roof layer is increased and a peak where the thickness of the roof layer is reduced.

13 Claims, 31 Drawing Sheets

DISPLAY DEVICE INCLUDING A GROOVE PATTERNED LOOF LAYER AND MANUFACTURING METHOD THEREOF

CROSS-REFERENCE TO RELATED APPLICATION

This application claims priority to and the benefit of Korean Patent Application No. 10-2014-0139243 filed in the Korean Intellectual Property Office on Oct. 15, 2014, the entire contents of which are incorporated herein by reference.

BACKGROUND (a) Field

The present inventive concept relates to a display device and a manufacturing method thereof.

(b) Description of the Related Art

A liquid crystal display, which is one of the most common types of flat panel displays currently in use, includes two display panels with field generating electrodes such as a pixel electrode, a common electrode, and the like, and a liquid crystal layer interposed therebetween. The liquid crystal display generates an electric field in the liquid crystal layer by applying voltages to the field generating electrodes to determine alignment of liquid crystal molecules of the liquid crystal layer and control polarization of incident light, thereby displaying images.

The two display panels configuring the liquid crystal display may include a thin film transistor array panel and an opposing display panel. In the thin film transistor array panel, a gate line transferring a gate signal and a data line transferring a data signal are formed to cross each other, and a thin film transistor connected to the gate line and the data line, a pixel electrode connected to the thin film transistor, and the like may be formed. In the opposing display panel, a light blocking member, a color filter, a common electrode, and the like may be formed. In some cases, the light blocking member, the color filter, and the common electrode may be formed on the thin film transistor array panel.

However, in a liquid crystal display in the related art, two substrates are necessarily used, and respective constituent elements are formed on the two substrates, and as a result, the display device according to the related art is heavy and thick, has a high cost and a long processing time.

The above information disclosed in this Background section is only for enhancement of understanding of the background of the inventive concept and therefore it may contain information that does not form the prior art.

SUMMARY

The present inventive concept has been made in an effort to provide a display device and a manufacturing method thereof having advantages of being capable of reducing weight, thickness, cost, and processing time by manufacturing the display device using one substrate.

Further, the present inventive concept has been made in an effort to provide a display device and a manufacturing method thereof having advantages of ameliorating liquid crystal operation characteristics by forming a groove at a roof layer.

An exemplary embodiment of the present inventive concept provides a display device including: an insulation substrate; a thin film transistor disposed on the substrate; a common electrode and a pixel electrode disposed on the thin film transistor to overlap each other with an insulating layer therebetween; a roof layer formed to be spaced apart from the pixel electrode formed on a pixel area with a microcavity therebetween; and a liquid crystal layer filling the microcavity. A lower portion of the roof layer may include a valley where a thickness of the roof layer is increased and a peak where the thickness of the roof layer is reduced.

The pixel area may include a data line and a gate line disposed in a direction that is perpendicular to the data line, the pixel electrode may include a plurality of cutouts, and the pixel electrode may include a plurality of branch electrodes formed by the cutouts.

The valley may include a plurality of valleys and the peak includes a plurality of peaks. The plurality of peaks and the plurality of valleys may be alternatingly formed along a horizontal direction in which the gate line extends, and the plurality of peaks or the plurality of valleys may extend in a direction parallel to the data line.

Valleys of the roof layer may be formed at positions corresponding to the plurality of branch electrodes, and peaks of the roof layer may be formed at positions corresponding to the plurality of cutouts.

Peaks of the roof layer may be formed at positions corresponding to the plurality of branch electrode, and valleys of the roof layer may be formed at positions corresponding to the cutouts.

A distance between adjacent peaks of the roof layer may be in a range about 3.5 um to about 4.5 um.

A distance from a peak to a valley of the roof layer may be in a range of about 0.5 um to about 1.5 um.

A cell gap of the microcavity may be in a range of about 3.8 um to about 4.8 um.

The display device may further include: an injection hole disposed at a first end of the roof layer to expose a part of the microcavity; and an overcoat formed on the roof layer to cover the injection hole and to seal the microcavity, wherein the support member having a pillar shape may be disposed to face the injection hole, and may be connected to a second end of the roof layer.

An upper portion of the microcavity may include a valley where a height of the microcavity is reduced and a peak where the height of the microcavity is increased.

An upper portion of the roof layer may have a flat surface.

The roof layer may include a supporting member.

The supporting member may be formed to face an injection hole through which the liquid crystal layer is injected.

An exemplary embodiment of the present inventive concept provides a manufacturing method of a display device, including: forming a thin film transistor on a substrate; forming a color filter on the thin film transistor; forming a common electrode on the color filter; forming an insulating layer on the common electrode; forming a pixel electrode connected to the thin film transistor on the insulating layer; forming a sacrificial layer of which a top surface includes undulation on the pixel electrode; forming a lower insulating layer on the sacrificial layer; forming a roof layer and a support member by coating an organic material on the lower insulating layer and patterning it; exposing the sacrificial layer; forming a microcavity between the lower insulating layer and the pixel electrode by removing the exposed sacrificial layer; and sealing the microcavity by forming an overcoat on the roof layer.

The top surface of the sacrificial layer may be patterned in a groove shape in which a valley where a thickness of the sacrificial layer is reduced and a peak where the thickness thereof is increased are formed.

The top surface of the sacrificial layer may be patterned by exposing the sacrificial layer using a mask with an open portion and a non-open portion that are alternately formed.

The pixel electrode may include a plurality of cutouts, and the pixel electrode may include a plurality of branch electrodes formed by the cutouts.

After the top surface of the sacrificial layer is patterned, valleys of the roof layer may be formed at positions corresponding to the pixel branch electrodes, and peaks of the roof layer may be formed at positions corresponding to the cutouts.

After the top surface of the sacrificial layer is patterned, peaks of the roof layer may be formed at positions corresponding to the pixel branch electrodes, and valleys of the roof layer may be formed at positions corresponding to the cutouts.

After the top surface of the sacrificial layer is patterned, the top surface of the sacrificial layer may include a plurality of minute grooves extending in parallel to a predetermined direction.

As described above, the display device and the manufacturing method thereof according to the exemplary embodiments of the present inventive concept have the following effects.

According to the exemplary embodiments of the present inventive concept, it is possible to provide a display device and a manufacturing method thereof which can reduce weight, thickness, cost, and processing time by manufacturing the display device by using one substrate.

Further, the liquid crystal anchoring energy is increased and thus afterimages are reduced by forming the groove pattern in which the peak and the valley are repeated at the upper portion of the microcavity of the display device In addition, the transmittance reduction caused by the groove pattern is prevented by increasing the cell gap of the microcavity as compared with the conventional case instead of forming the groove pattern.

DETAILED DESCRIPTION

Figure 1:
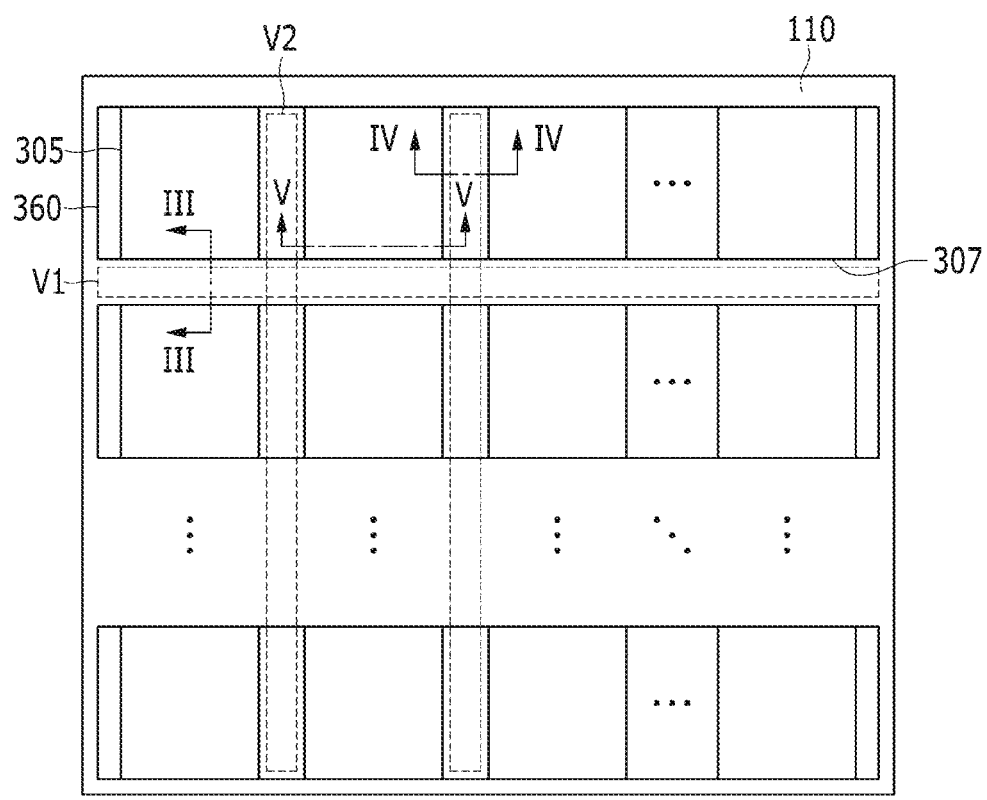
FIG. 1 is a top plan view illustrating a display device according to an exemplary embodiment of the present inventive concept.

The present inventive concept will be described more fully hereinafter with reference to the accompanying drawings, in which exemplary embodiments of the inventive concept are shown. As those skilled in the art would realize, the described embodiments may be modified in various different ways, all without departing from the spirit or scope of the present inventive concept.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present between the element and the another element. In contrast, when an element is referred to as being "directly on" another element, there are no intervening elements present between the element and the another element.

Now, a display device according to an exemplary embodiment of the present inventive concept will be described with reference to accompanying drawings.

First, a display device according to an exemplary embodiment of the present inventive concept will be described with reference to FIG. 1.

FIG. 1 is a top plan view illustrating the display device according to the present exemplary embodiment.

The display device according to the present exemplary embodiment includes a substrate 110 made of a material such as glass or plastic.

A plurality of microcavities 305 covered by a plurality of roof layers 360 are formed on the substrate 110. The roof layers 360 extend in a row direction, and the microcavities 305 are formed under one roof layer of the plurality of roof layers 360.

The microcavities 305 may be arranged in a matrix form, first valleys V1 are formed between the microcavities 305 that are adjacently arranged in the column direction, and second valleys V2 are formed between the microcavities 305 adjacently arranged in a row direction.

The roof layers 360 may be separated from each other with the first valleys V1 interposed therebetween. The microcavities 305 in the portion contacting the first valleys V1 are not covered by the roof layers 360 and exposed. This is referred to as an injection hole 307. An injection hole 307 may be formed at one edge of each microcavity 305.

Each roof layer 360 is formed between the adjacent second valleys V2 to be spaced apart from the substrate 110, thereby forming the microcavity 305. That is, the roof layer 360 is formed to cover all sides of the microcavity 305 except for a lateral side of the microcavity 305 where the injection hole 307 is formed. Thus, the roof layer 360 includes a side wall having three sides excluding the lateral side of the microcavity 305, and a top side covering the side wall. In this case, a lateral side positioned at the edge facing the injection hole 307 may be a horizontal support member, and a lateral side positioned at edges coupled to the horizontal supporting member to form the side wall may be a vertical support member.

The aforementioned structure of the display device according to the exemplary embodiment of the present inventive concept is just an example, and various modifications are possible. For example, an arrangement of the microcavities 305, the first valleys V1, and the second valleys V2 may be altered, the roof layers 360 may be connected to each other in the first valleys V1, and a part of each roof layer 360 may be formed to be spaced apart from the substrate 110 in the corresponding second valleys V2 to connect the adjacent microcavities 305 to each other.

Figure 2:
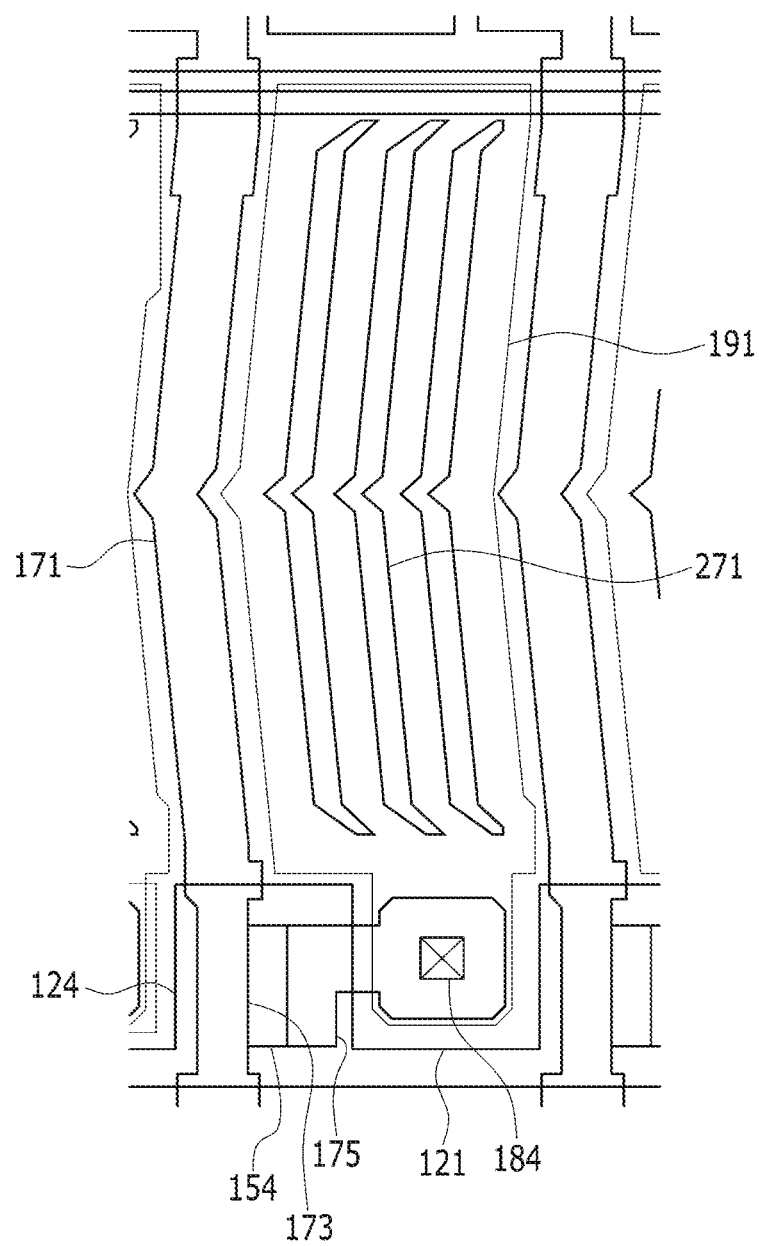
FIG. 2 is top plan view illustrating one pixel of the display device according to an exemplary embodiment of the present inventive concept.

Hereinafter, the display device according to the exemplary embodiment of the present inventive concept will be described with reference to FIG. 2 to FIG. 4.

First, a gate conductor including a gate line 121 is formed on an insulation substrate 110 made of transparent glass, plastic, or the like.

The gate line 121 includes a gate electrode 124 and a gate pad portion (not illustrated) for connection with another layer or an external driving circuit. The gate line 121 may be made of an aluminum-based metal such as aluminum (Al) or an aluminum alloy, a silver-based metal such as silver (Ag) or a silver alloy, a copper-based metal such as copper (Cu) or a copper alloy, a molybdenum-based metal such as molybdenum (Mo) or a molybdenum alloy, chromium (Cr), tantalum (Ta), and titanium (Ti). However, the gate line 121 may have a multilayered structure including at least two conductive layers having different physical properties.

A gate insulating layer 140 made of a silicon nitride (SiNx), a silicon oxide (SiOx), or the like is formed on a gate conductor 121. The gate insulating layer 140 may have a multilayered structure including at least two insulating layers having different physical properties.

A semiconductor 154 made of amorphous silicon or polysilicon is formed on the gate insulating layer 140. The semiconductor 154 may include an oxide semiconductor.

An ohmic contact (not illustrated) may be disposed on the semiconductor 154. The ohmic contact (not illustrated) may be made of a material such as n+ hydrogenated amorphous silicon or a n+ poly silicon in which an n-type impurity such as phosphorus is doped at a high concentration, or of a silicide. The ohmic contacts (not illustrated) may be disposed on the semiconductor 154 to be spaced apart from each other. In the case where the semiconductor 154 is an oxide semiconductor, the ohmic contact may be omitted.

A data conductor including a data line 171, a source electrode 173 and a drain electrode 175 is formed on the semiconductor 154 and the gate insulating layer 140.

The data line 171 includes a data pad portion (not illustrated) for connection with another layer or an external driving circuit. The data line 171 transfers a data signal and mainly extends in a column direction to cross the gate line 121.

In this case, the data line 171 may have a first curved portion with a curved shape, and parts of the curved portion meet each other in a middle region of the pixel area to have a V-letter shape. A second curved portion which is curved to form a predetermined angle with the first curved portion may be further included in the middle region of the pixel area.

The first curved portion of the data line 171 may be curved to form an angle of about 7° with a vertical reference line which forms an angle of 90° with an extending direction of the gate line 121. The second curved portion disposed in the middle region of the pixel area may be further curved to form an angle of about 7° to about 15° with the first curved portion.

The source electrode 173 may be a part of the data line 171, and is disposed on the same line as the data line 171. The drain electrode 175 is formed to extend in parallel with the source electrode 173. Accordingly, the drain electrode 175 may have a portion parallel with a portion of the data line 171.

The gate electrode 124, the source electrode 173, and the drain electrode 175 form one thin film transistor (TFT) together with the semiconductor 154, and a channel of the thin film transistor is formed in the semiconductor 154 between the source electrode 173 and the drain electrode 175.

The liquid crystal display according to the exemplary embodiment of the present inventive concept includes the source electrode 173 positioned on the same line as the data line 171 and the drain electrode 175 extending in parallel with the data line 171, and as a result, a width of the thin film transistor may be increased while an area occupied by the data conductor is not increased, thereby increasing an aperture ratio of the liquid crystal display.

However, in the case of a liquid crystal display according to another exemplary embodiment of the present inventive concept, the source electrode 173 and the drain electrode 175 may have different shapes.

The data line 171 and the drain electrode 175 may be made of a refractory metal such as molybdenum, chromium, tantalum, and titanium or an alloy thereof, and may have a multilayered structure including a refractory metal layer (not illustrated) and a low resistive conductive layer (not illustrated). An example of the multilayered structure may include a double layer of a chromium or molybdenum (alloy) lower layer and an aluminum (alloy) upper layer, or a triple layer of a molybdenum (alloy) lower layer, an aluminum (alloy) middle layer, and a molybdenum (alloy) upper layer. However, the data line 171 and the drain electrode 175 may be made of various metals or conductors other than the metals.

A passivation layer 180 is disposed on the data conductor 171, 173, and 175, the gate insulating layer 140, and an exposed portion of the semiconductor 154. The passivation layer 180 may be made of an organic insulating material, an inorganic insulating material, or the like.

A color filter 230 is formed in each pixel area PX on the passivation layer 180. Each color filter 230 may display one of the primary colors such as three primary colors of red, green, and blue. The color filter 230 is not limited to display the three primary colors of red, green, and blue, but may display cyan, magenta, yellow, and white-based colors. The color filter 230 may be elongated in a column direction along a space between the adjacent data lines 171.

An organic layer 240 is disposed on the color filter 230. The organic layer 240 may be thicker that of the passivation layer 180, and may have a planarized surface.

The organic layer 240 is disposed on the display area where the plurality of pixels are disposed, but may not be disposed on the peripheral area where a gate pad portion or a data pad portion is formed. Further, the organic layer 240 may be positioned even in the peripheral area where a gate pad portion or a data pad portion is formed.

The organic layer 240, the color filter 230, and the passivation layer 180 have a contact hole 184.

A common electrode 270 is positioned on the organic layer 240. The common electrode 270 may have a planar shape, and the common electrode 270 is disposed on the display area where the plurality of pixels are formed, but may not be disposed in the peripheral area where the gate pad portion or the data pad portion is formed.

The common electrode 270 may be made of a transparent conductive layer such as ITO or IZO.

An insulating layer 250 is disposed on the common electrode 270. The insulating layer 250 may be made of an inorganic insulating material such as a silicon nitride (SiNx), a silicon oxide (SiOx), and a silicon oxynitride (SiOxNy). The insulating layer 250 serves to protect the color filter 230 made of the organic material and the like and insulate the common electrode 270 and a pixel electrode 191 from each other. That is, even though the common electrode 270 is formed to be overlapped with the pixel electrode 191, since the insulating layer 250 is formed on the common electrode 270, it is possible to prevent the common electrode 270 and the pixel electrode 191 from being short-circuited by contacting each other.

The pixel electrode 191 is disposed on the insulating layer 250 to overlay the common electrode 270. The pixel electrode 191 includes curved edges which are substantially parallel with the first curved portion and the second curved portion of the data line 171.

The pixel electrode 191 may be made of a transparent conductive layer such as ITO or IZO.

The pixel electrode 191 is physically and electrically connected to the drain electrode 175 through the contact hole 184 formed in the organic layer 240, the color filter 230, and the passivation layer 180 to receive a voltage from the drain electrode 175.

The pixel electrode 191 receives the data voltage from the drain electrode 175, and the common electrode 270 receives a reference voltage having a predetermined magnitude from a reference voltage applying unit disposed at the outside of the display area.

The pixel electrode 191 and the common electrode 270 generate an electric field by applying different voltages, and liquid crystal molecules of the liquid crystal layer 310 positioned on the two electrodes 191 and 270 rotate in a direction parallel to a direction of the electric field. Polarization of light passing through the liquid crystal layer varies according to the rotation directions of the liquid crystal molecules determined as described above.

A lower insulating layer 350 may be further formed on the pixel electrode 191 so as to be spaced apart from the pixel electrode 191 by a predetermined distance. The lower insulating layer 350 may be made of an inorganic insulating material such as a silicon nitride (SiNx) and a silicon oxide (SiOx).

Figure 4:
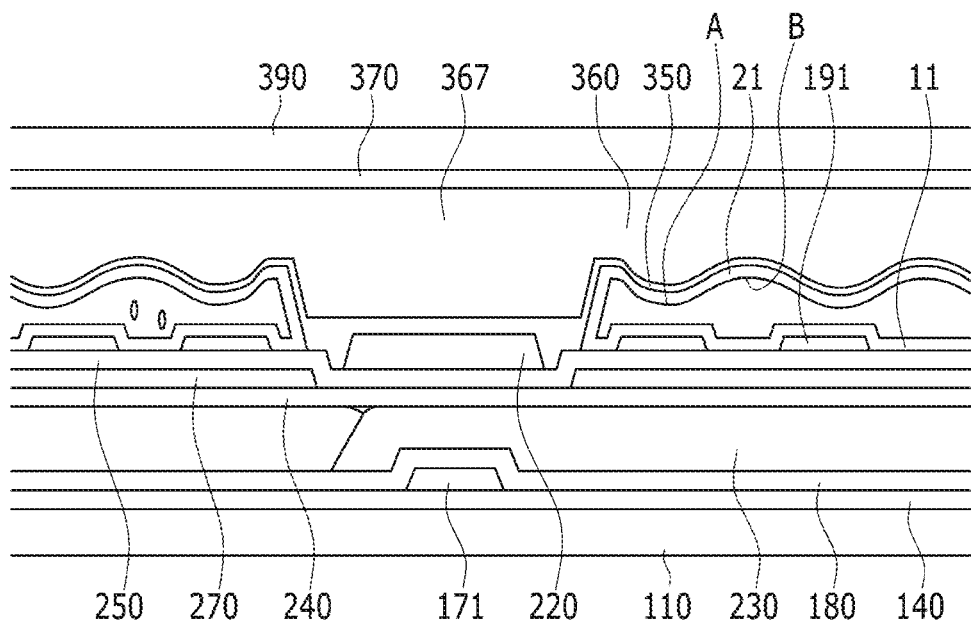
FIG. 4 is a cross-sectional view of the display device taken along a line IV-IV of FIG. 1 according to an exemplary embodiment of the present inventive concept.
Figure 5:
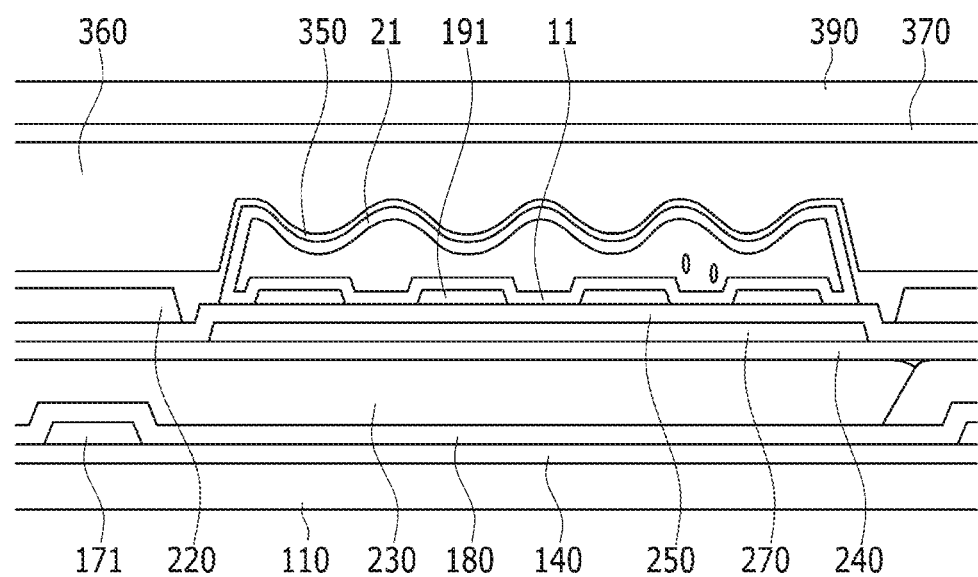
FIG. 5 is a cross-sectional view of the display device taken along a line V-V of FIG. 1 according to an exemplary embodiment of the present inventive concept.

As shown in FIG. 4 and FIG. 5, the lower insulating layer 350 is formed to have a groove in a predetermined cycle. Specifically, the lower insulating layer 350 is formed with a pattern in which a concave portion and a convex portion are repeated in a cycle. This is because a top surface of a microcavity is formed to have such a groove. This shape will be described in detail later.

A microcavity 305 is formed between the pixel electrode 191 and the lower insulating layer 350. That is, the microcavity 305 is surrounded by the pixel electrode 191 and the lower insulating layer 350. A width and an area of the microcavity 305 may be variously modified according to a size and a resolution of the display device.

In this case, the microcavity is formed in a groove pattern in which a peak and a valley are alternatingly formed along a horizontal direction of one pixel, i.e., in a direction that is parallel to a direction in which the gate line 121 extends. Accordingly, in the case of FIG. 3 illustrating a display device taken along a horizontal line III-III of FIG. 1, the groove of this microcavity is not shown.

In contrast, in the case of FIG. 4 and FIG. 5 illustrating the display device taken along a line IV-IV of FIG. 1, the pattern in which the peak and the valley are repeated in a horizontal direction of the microcavity of the display device is formed.

In the present exemplary embodiment, a curved portion of the microcavity that is concavely formed such that the height of the microcavity 305 is reduced is referred to as a valley A, and a curved portion of the microcavity that is convexly formed such that the height of the microcavity 305 is increased is referred to as a peak B.

FIG. 5 is a cross-sectional view of a display device taken along a line V-V of FIG. 1 according to an exemplary embodiment of the present inventive concept. Referring to FIG. 5, the microcavity 305 according to the present exemplary embodiment is formed to have a groove pattern in which a valley and a peak are repeated to correspond to positions at which branch electrodes of the pixel electrode 191 are formed.

The microcavity formed with the grooves can improve surface anchoring energy of the liquid crystal, thus, improve the dynamic characteristics of the liquid crystals. In this case, locations, length, and depth of the grooves may be variously changed according to exemplary embodiments. The exemplary embodiments and the effect of the microcavity will be described later.

This microcavity may be formed by exposing a sacrificial layer with a patterned mask before removing the sacrificial layer. The manufacturing process of this microcavity will be described later.

A first alignment layer 11 is formed on the pixel electrode 191. The first alignment layer 11 may also be formed directly on the lower insulating layer 350 which is not covered by the pixel electrode 191.

A second alignment layer 21 is formed below the lower insulating layer 350 to face the first alignment layer 11.

In this case, since the lower insulating layer is formed in a groove pattern in which the valley and the peak are repeated, the second alignment layer may also be formed in the pattern in which the valley and the peak are repeated, as shown in FIG. 4 and FIG. 5.

The first alignment layer 11 and the second alignment layer 21 may be formed by horizontal alignment layers, and may be made of alignment materials such as polyamic acid, polysiloxane, and polyimide. The first and second alignment layers 11 and 21 may be connected to each other at an edge of the microcavity 305 as illustrated in FIG. 3. In other words, the first alignment layer and the second alignment layer may be simultaneously formed in one process. For convenience, the first alignment layer and the second alignment layer are described as separated members, but actually the first and second alignment layer may be connected to each other as one single alignment layer.

A liquid crystal layer including liquid crystal molecules 310 is formed in the microcavity 305 positioned between the pixel electrode 191 and the lower insulating layer 350.

Figure 3:
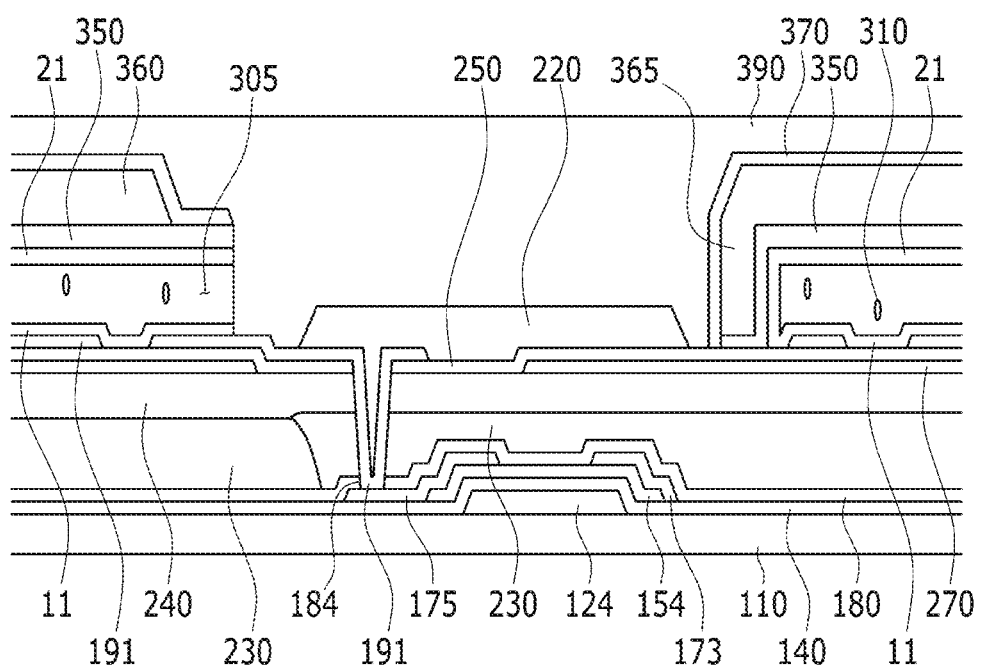
FIG. 3 is a cross-sectional view of the display device taken along a line III-III of FIG. 1 according to an exemplary embodiment of the present inventive concept.

Further, a light blocking member 220 is formed in a region between the adjacent color filters 230, and particularly, may be positioned on the pixel electrode 191 and the insulating layer 250 which is not covered by the pixel electrode, as illustrated in FIG. 3. The light blocking member 220 is formed on a boundary of the pixel area PX and the thin film transistor to prevent light leakage.

The light blocking member 220 extends along the gate line 121 and also extends upward and downward. Thus, the light blocking member 220 includes a horizontal light blocking member covering a region where the thin film transistor and the like are formed and a vertical light blocking member extending along the data line 171. That is, the horizontal light blocking member may be formed at the first valley V1, and the vertical light blocking member may be formed at the second valley V2. The color filter 230 and the light blocking member 220 may overlap each other in a partial region.

Next, the roof layer 360 is formed on the lower insulating layer 350. The roof layer 360 may be made of an organic material. The microcavity 305 is formed below the roof layer 360, and the roof layer 360 is hardened by a curing process to maintain the shape of the microcavity 305. The roof layer 360 is formed to be spaced apart from the pixel electrode 191 with the microcavity 305 therebetween.

Since the roof layer 360 is formed to be spaced apart from the pixel electrode 191 with the microcavity therebetween, the roof layer according to the present exemplary embodiment also has a curved line pattern in which a valley and a peak are repeated.

That is, as shown in FIG. 4 and FIG. 5, a groove pattern in which a valley and a peak are repeated is formed at a lower portion of the roof layer that is adjacent to the microcavity.

In this case, a curved line region of the roof layer 360 that is convexly formed toward the substrate (i.e., in the downward direction) such that the thickness thereof is increased is referred to as a peak, and a curved line region of the roof layer 360 that is concavely formed in the upward direction such that the thickness thereof is reduced is referred to as a valley. The shape and size of the groove will be described later in detail.

However, an upper portion of roof layer 360 has a planarized surface without the groove pattern. Accordingly, the layers that are stacked on the roof layer 360 are not affected by the microcavity 305. The roof layer 360 is formed to have a thickness that is differently adjusted according to regions. Particularly, the thickness of the roof layer 360 is repeatedly increased and decreased in a predetermined cycle at a region on the pixel electrode 191.

The roof layers 360 are formed in each pixel area PX along a pixel row and at the second valley V2, but the roof layer 360 is not formed at the first valley V1. The microcavity 305 is not formed below the roof layer 360 at the second valley V2. Accordingly, a thickness of the roof layer 360 positioned at the second valley V2 may be thicker than a thickness of the roof layer 360 positioned in the pixel area, and the thick region may be called a vertical support member 367. An upper surface and both sides of the microcavity 305 are formed to be covered by the roof layer 360.

An injection hole 307 exposing a part of the microcavity 305 is formed in the roof layer 360. The lower insulating layer 350 adjacent to the region where the injection hole 307 is formed may include a region which protrudes more than the roof layer 360.

The injection hole 307 according to the exemplary embodiment of the present inventive concept may be formed at one edge of the pixel area PX. For example, the injection hole 307 may be formed to correspond to a lower side of the pixel area PX to expose one surface of the microcavity 305. On the contrary, the injection hole 307 may be formed to correspond to an upper side of the pixel area PX.

Further, the injection hole 307 may be formed at one of two edges of each microcavity 305 facing each other.

Since the microcavity 305 is exposed by the injection hole 307, an aligning agent, a liquid crystal material, or the like may be injected into the microcavity 305 through the injection hole 307.

The support member 365 is formed at the position facing the injection hole 307 below the roof layer 360, and for example, may be a horizontal support member 365. That is, when the injection hole 307 is formed to correspond to one edge of the microcavity 305, the support member 365 is positioned at an opposite edge corresponding to one edge of the microcavity 305.

Hereinafter, the "support member 365" is called the horizontal support member 365 formed at a space facing the injection hole 307.

The microcavity 305 is formed below the roof layer 360 so that the roof layer 360 may sag downward at the injection hole 307 corresponding to an inlet of the microcavity 305. In the display device according to the exemplary embodiment of the present inventive concept, since the support member 365 formed at the position opposite to the injection hole 307 supports the roof layer 360, the sag of the roof layer 360 may be prevented.

The horizontal support member 365 is formed at any one of opposite edges of two different microcavities 305. The plurality of microcavities 305 is disposed in a matrix form which includes a plurality of pixel rows and a plurality of pixel columns. For example, the microcavity 305 may have a quadrangular shape, and a lower edge of the microcavity 305 in a first row and an upper edge of the microcavity 305 in a second row face each other. In this case, the support member 365 is formed at any one of a lower edge of the microcavity 305 in the first row and an upper edge of the microcavity 305 in the second row which faces each other. In the case where the support member 365 is formed at the lower edge of the microcavity 305 in the first row, the support member 365 is formed at the lower edge even in the microcavity in the second row, and an opposite case is the same.

In this case, positions where the support member 365 and the injection hole 307 are formed are different from each other. That is, when the injection hole 307 is formed at the edge corresponding to the upper side of the microcavity 305, the support member 365 is formed at the edge corresponding to the lower side of the microcavity 305. An opposite case is the same. When the injection hole 307 is formed at the edge corresponding to the lower side of the microcavity 305, the support member 365 is formed at the edge corresponding to the upper side of the microcavity. Meanwhile, in the region where the injection hole 307 is formed, the lower insulating layer 350 includes the region which protrudes more than the roof layer 360, but in the region where the support member 365 is formed, the lower insulating layer 350 may not include the region which protrudes more than the roof layer 360. In this case, the end of the lower insulating layer 350 and the end of the support member 365 may be on the same vertical line.

The first valleys V1 are formed between the microcavities 305 positioned in different rows. The support member 365 is formed to be adjacent to one side of the first valley V1.

The support member 365 is connected with the roof layer 360, and may be made of the same material as the roof layer 360. The lower insulating layer 350 may be positioned below the support member 365.

However, the present inventive concept is not limited thereto, and the support member 365 may be made of a different material from the roof layer 360, and the lower insulating layer 350 may not be positioned below the support member 365. In this case, the support member 365 may be formed directly on the pixel electrode 191.

However, this is merely an example, and the support member 365 may be omitted.

An upper insulating layer 370 may be further formed on the roof layer 360. The upper insulating layer 370 may be made of an inorganic insulating material such as a silicon nitride (SiNx) and a silicon oxide (SiOx). The upper insulating layer 370 may be formed so as to cover an upper surface and sides of the roof layer 360. The upper insulating layer 370 serves to protect the roof layer 360 made of an organic material, and may be omitted if necessary.

As illustrated in FIG. 3, the upper insulating layer 370 may contact the lower insulating layer 350 which protrudes more than the roof layer 360 in the region where the injection hole 307 is positioned. Further, the upper insulating layer 370 may have a stepped cross-section by a step between the region contacting the lower insulating layer 350 and the region covering the roof layer 360.

Further, the upper insulating layer 370 may be connected to the lower insulating layer 350. The upper insulating layer 370 may contact or overlap the lower insulating layer 350 where the support member 365 is positioned.

An overcoat 390 may be formed on the upper insulating layer 370. The overcoat 390 is formed to cover the injection hole 307 exposing the part of the microcavity 305 to the outside. That is, the overcoat 390 may seal the microcavity 305 so that the liquid crystal molecules 310 formed in the microcavity 305 are not discharged to the outside. Since the overcoat 390 contacts the liquid crystal molecules 310, the overcoat 390 may be made of a material which does not react with liquid crystal molecules 310. For example, the overcoat 390 may be made of parylene and the like.

The overcoat 390 may be formed as a multilayer such as a double layer and a triple layer. The double layer is configured by two layers made of different materials. The triple layer is configured by three layers, and materials of adjacent layers are different from each other. For example, the overcoat 390 may include a layer made of an organic insulating material and a layer made of an inorganic insulating material. A top surface of this overcoat 390 may have a substantially flat surface even at the first valley and the second valley, and a polarizer or the like may be attached on the flat top surface.

Although not illustrated, polarizers may be further formed on upper and lower surfaces of the display device. The polarizers may include a first polarizer and a second polarizer. The first polarizer may be attached onto the lower surface of the substrate 110, and the second polarizer may be attached onto the overcoat 390.

As such, the display device according to the present exemplary embodiment improves the surface anchoring energy of the liquid crystal, thus, improves the dynamic characteristics of the liquid crystals by forming the groove pattern in which the valley and the peak are repeated at the upper portion of the microcavity.

Figure 6:
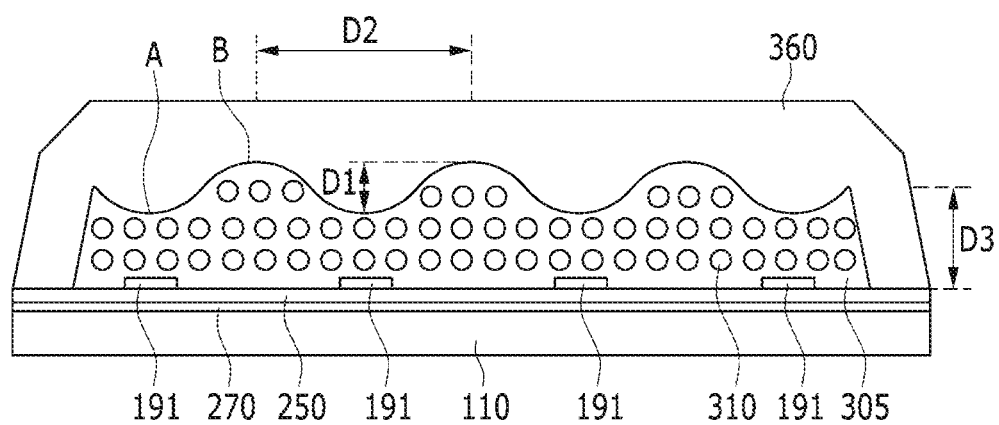
FIG. 6 and FIG. 7 schematically illustrate a cross-sectional view of the display device according to an exemplary embodiment of the present inventive concept.
Figure 7:
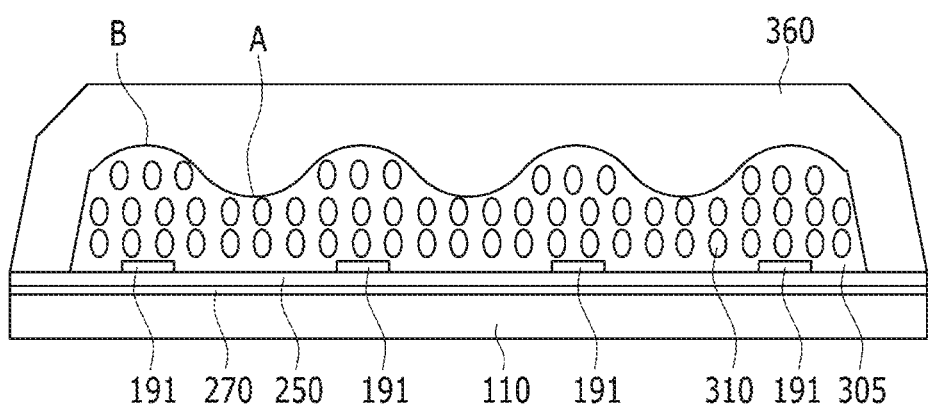

Hereinafter, display devices according to various exemplary embodiments of the present inventive concept will be described with reference to pertinent drawings. FIG. 6 and FIG. 7 schematically illustrate a cross-sectional view of the display device according to an exemplary embodiment of the present inventive concept.

FIG. 6 and FIG. 7 illustrate a cross-section of the same portion as that of FIG. 5. For better comprehension and ease of description, only the roof layer 360, the microcavity 305, the pixel electrode 191, the insulating layer 250, the common electrode 270, and the substrate 110 are illustrated therein. However, it shall be obvious that constituent elements that were illustrated in FIG. 5 are included in the display device according to the present exemplary embodiments although they are not illustrated in FIG. 6 and FIG. 7.

Referring to FIG. 6, in a display device according to an exemplary embodiment of the present inventive concept, the valley A of the microcavity is formed at a position correspond to the branch electrode of the pixel electrode 191. In other words, the valley A of the microcavity is formed above a position at which the pixel electrode 191 is formed.

Accordingly, as shown in FIG. 6, the valley A of the microcavity is formed above the pixel electrode 191, and thus a width of the microcavity formed above the pixel electrode is narrow. Simultaneously, since the valley A of the roof layer is formed above the pixel electrode, the thickness of the roof layer is increased.

The peak B is formed between the pixel electrodes such that the height of the microcavity is increased. Simultaneously, since the peak of the roof layer is formed between the pixel electrodes, the thickness of the roof layer is reduced as compared with the valley A.

In this case, a distance D1 from the valley A to the peak B may be in a range of about 0.5 um to about 1.5 um. For example, the distance from the valley A to the peak B may be about 1.0 um.

Further, a distance D2 between the peaks, i.e., the distance D2 of the unit in which the pattern is repeated, may be in a range of about 3.5 um to about 4.5 um. In the present exemplary embodiment, the distance D2 is about 4.0 um. However, it shall be obvious that the distances are changeable according to disposal intervals and sizes of the pixel electrode 191.

FIG. 7 illustrates a display device according to another exemplary embodiment of the present inventive concept. Referring to FIG. 7, in the display device according to the exemplary embodiment of FIG. 7, a groove of the microcavity is formed to have a shape that is different from that of the exemplary embodiment of FIG. 6. Specifically, the valley A of the microcavity is formed at a position so as not to face the pixel electrode 191 in the display device according to the exemplary embodiment of FIG. 7.

Specifically, referring to FIG. 7, the peak B is formed on a region correspond to the pixel electrode 191, and the valley A is formed on a region corresponding to a space between the pixel electrode. Thus, the difference in height of the microcavity is reduced as compared to the embodiment of FIG. 7.

In the case that an upper portion of the microcavity is formed in the groove pattern in which the peak and the valley are repeated as shown in FIG. 6 and FIG. 7, additional anchoring energy is generated in a forward direction of the peak and the valley due to the groove pattern. The additional anchoring energy facilitates solving a problem that afterimages are formed due to the low anchoring energy of the existing photo-alignment layer. Hereinafter, the effect of a display device according to an exemplary embodiment of the present inventive concept will be described by comparing a display device according to a comparative embodiment of the present inventive concept.

Figure 8:
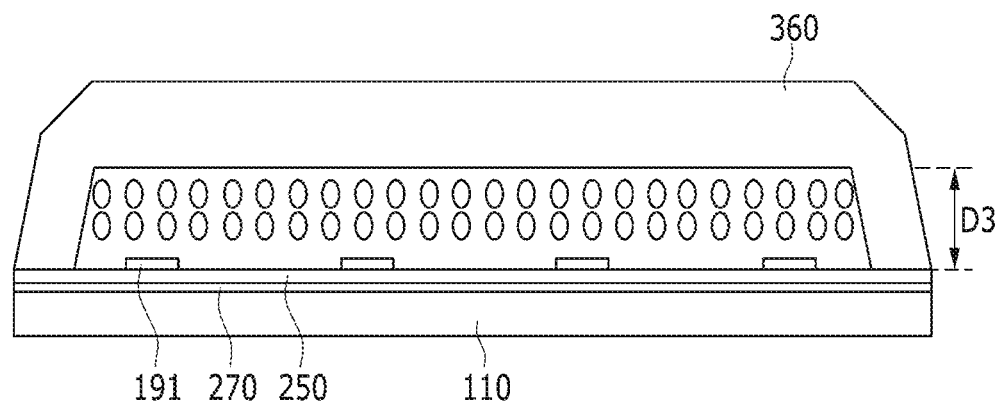
FIG. 8 is a cross-sectional view of a display device according to a comparative embodiment of the present inventive concept, illustrating a cross-section of the same portion as those of FIG. 6 and FIG. 7.

FIG. 8 is a cross-sectional view of the display device according to the comparative embodiment of the present inventive concept, illustrating a cross-section of the same portion as those of FIG. 6 and FIG. 7.

Referring to FIG. 8, the display device according to the comparative embodiment of the present inventive concept includes a microcavity having an upper portion that has a flat surface without being curved.

In the case that the display device including the microcavity having liquid crystal molecules as shown in FIG. 1 to FIG. 8, a photo-alignment method is preferable to align alignment layers 11 and 21 because it is difficult to use a contact type of alignment method since the alignment layers 11 and 21 are required to be formed in the microcavity 305.

However, when this non-contact type of alignment method is used to align the alignment layers 11 and 21, it is difficult to secure a sufficient surface anchoring energy for aligning the liquid crystal molecules.

Accordingly, the display device having the same structure as shown in FIG. 8 has insufficient surface anchoring energy for the liquid crystal molecules, thereby obtaining poor dynamic characteristics of the liquid crystal molecules, which may cause afterimages.

However, as shown in FIG. 6 and FIG. 7, in the exemplary embodiments of the present inventive concept, the display device according to the exemplary embodiments of the present inventive concept generates additional surface anchoring energy by forming an upper portion of the microcavity in a curved line pattern in which the peak and the valley are repeated. This pattern in which the peak and the valley are repeated causes additional surface anchoring energy by the groove, thereby eliminating the problems caused by the low anchoring energy. Accordingly, by changing the shape of the upper portion of the microcavity, it is possible to solve the conventional afterimage problem because the change in shape increases the surface anchoring force of the liquid crystal.

Referring to FIG. 6, in the display device according to the exemplary embodiment of the present inventive concept, a cell gap D3 of the microcavity may be in a range of 3 um to 5 um. For example, the cell gap D3 of the microcavity may be in a range of 3.8 um to 4.8 um.

Referring to FIG. 8, in the display device according to the comparative embodiment of the present inventive concept, the cell gap D3 of the microcavity is about 3 um.

However, in the display device according to the exemplary embodiment of the present inventive concept, in the case of maintaining the cell gap that is similar to the cell gap according to the comparative embodiment of the present inventive concept, a problem that the transmittance is reduced by the groove pattern formed at the upper portion of the microcavity may be generated.

Figure 9A:
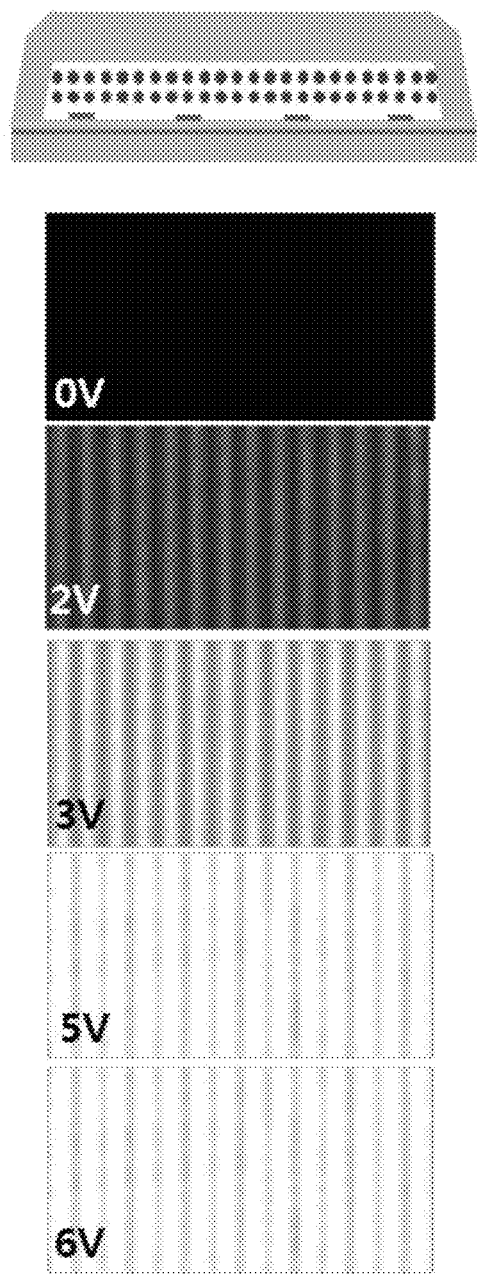
FIGS. 9A, 9B and 9C are transmittance characteristics of display devices according to the exemplary embodiments of the present inventive concept and the comparative embodiment.
Figure 9B:
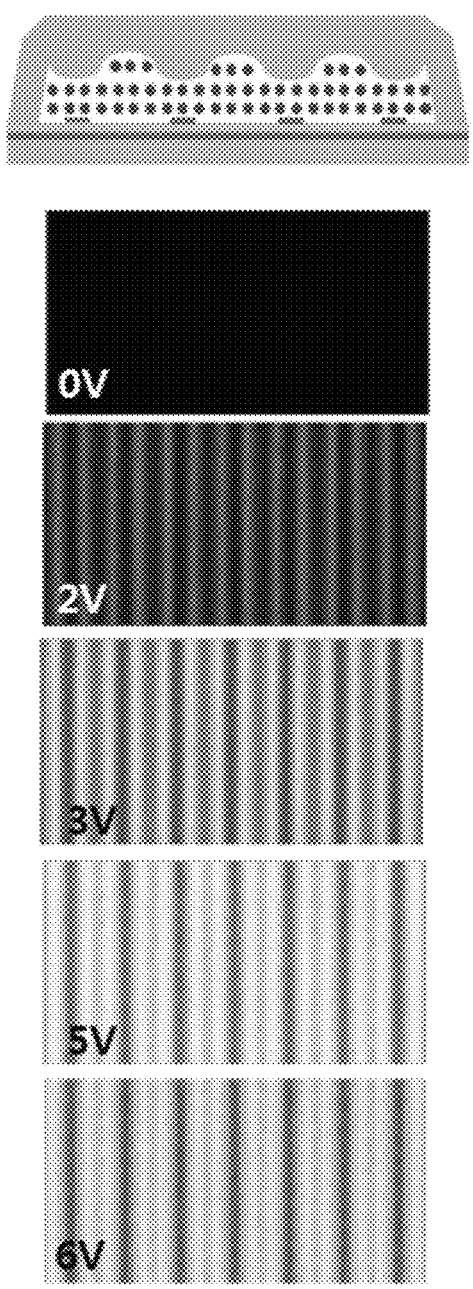
Figure 9C:
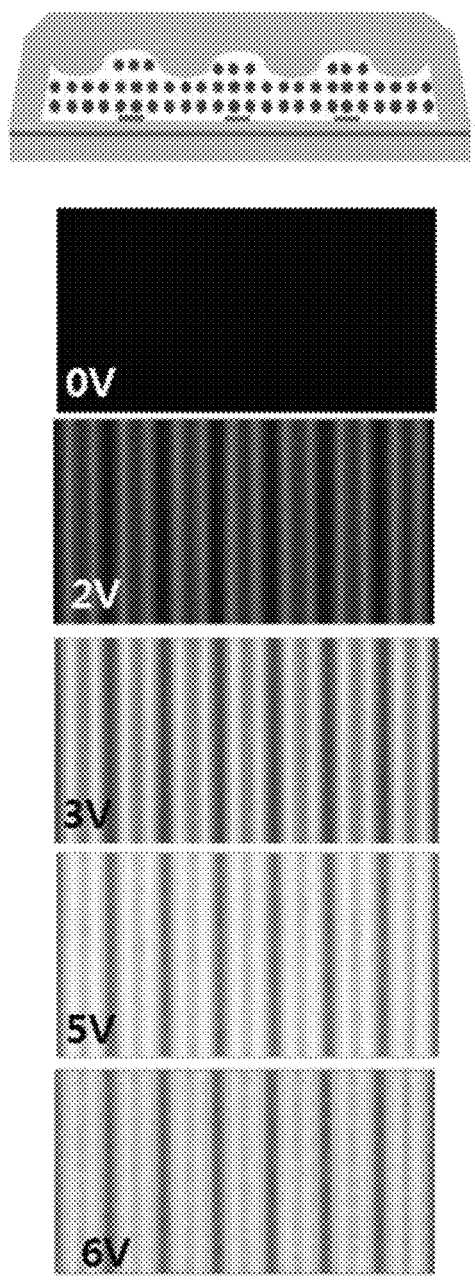

FIG. 9A to FIG. 9C are transmittance characteristics of display devices according to the exemplary embodiments of the present inventive concept (No. 2 and No. 3) and the comparative embodiment (Reference).

Figure 10:
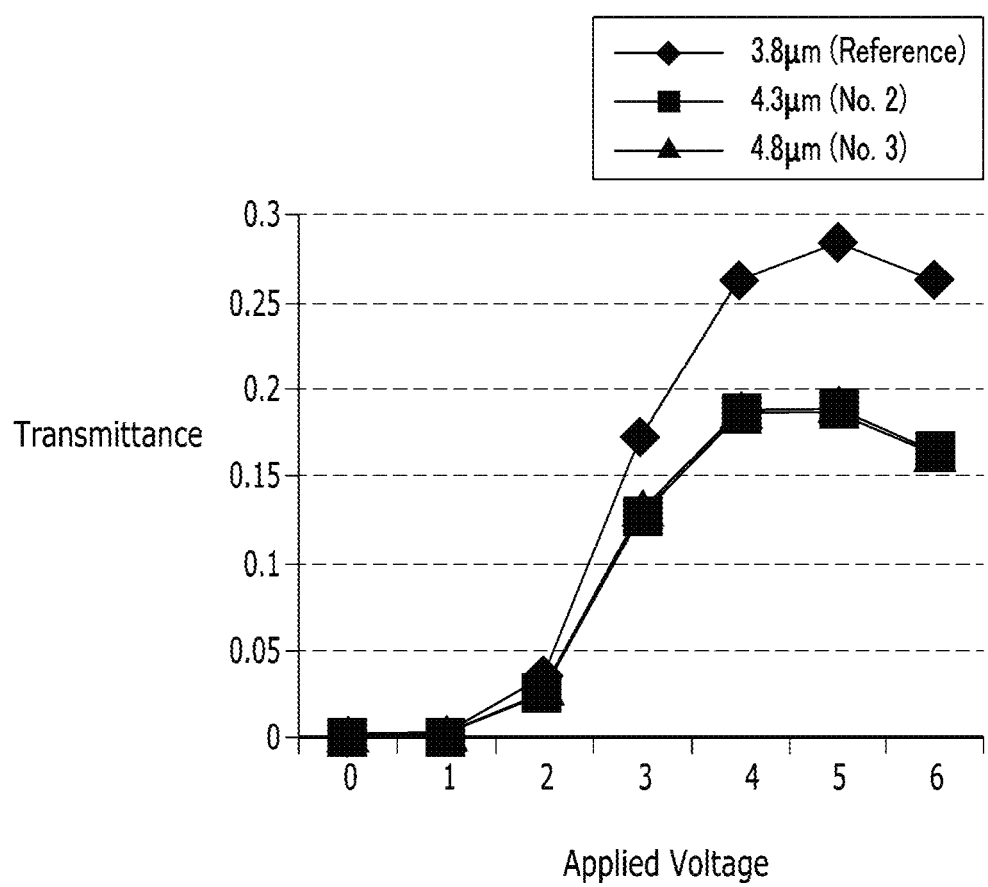
FIG. 10 is a graph illustrating the results of tests shown in FIG. 9.

FIG. 10 is a graph illustrating results of the tests shown in FIG. 9.

Referring to FIG. 9 and FIG. 10, it is seen that the transmittance is deteriorated by about 30% in the case of the display device including the microcavity having the upper portion including the groove pattern. This is because, when the groove pattern is formed, the cell gap and retardation are reduced according to the exemplary embodiment of the present inventive concept.

Accordingly, the display device according to the exemplary embodiment of the present inventive concept can compensate this transmittance reduction by increasing the cell gap of the microcavity by about 1 um.

Specifically, the cell gap is greater than 3 um in the display device according to the exemplary embodiment of the present inventive concept. For example, the cell gap may be in a range of 3.8 um to 4.8 um.

Figure 11A:
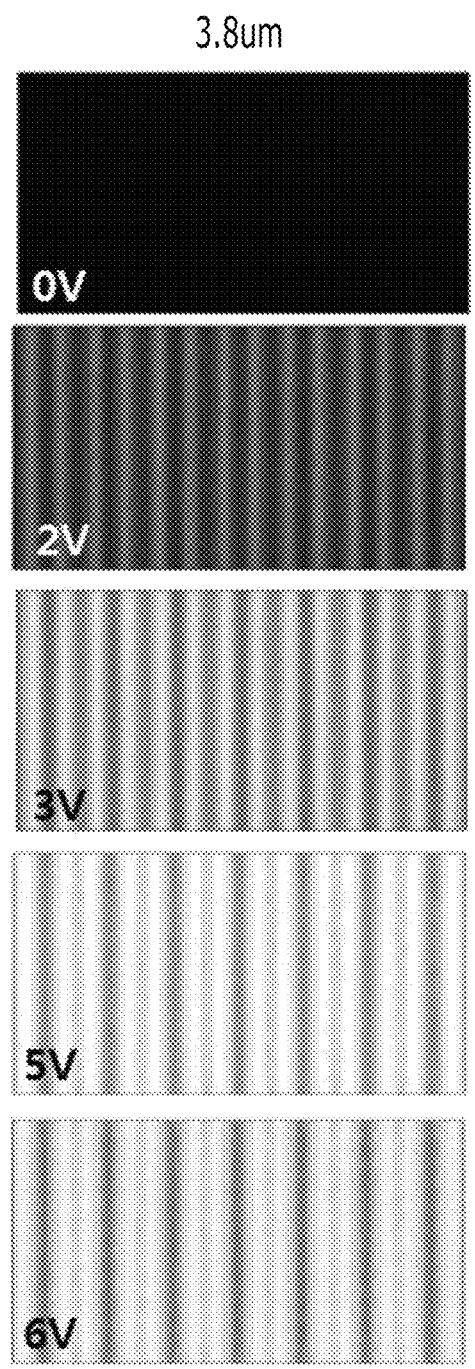
FIGS. 11A, 11B and 11C are transmittance characteristics of display devices according to applied voltages by varying a cell gap in a display device having the same structure as that of FIG. 6 according to an exemplary embodiment of the present inventive concept.
Figure 11B:
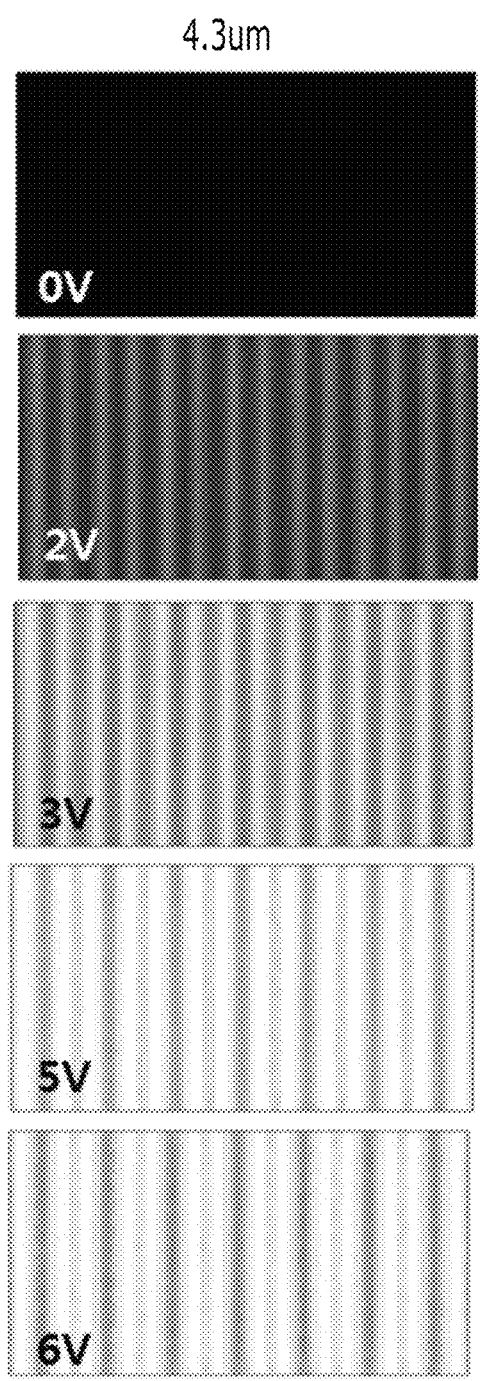
Figure 11C:
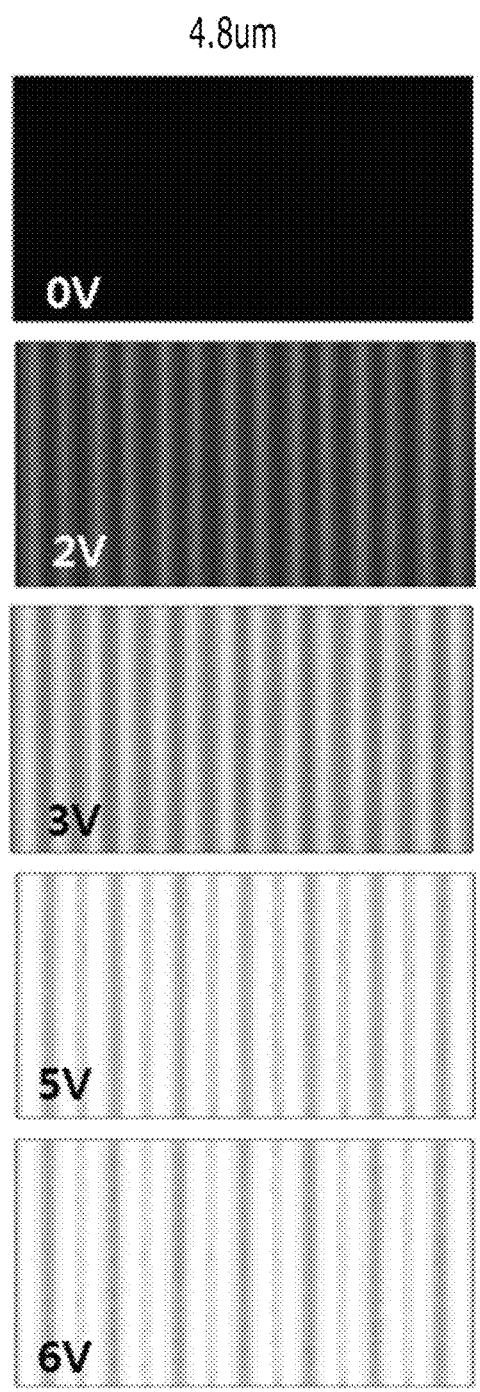
Figure 12:
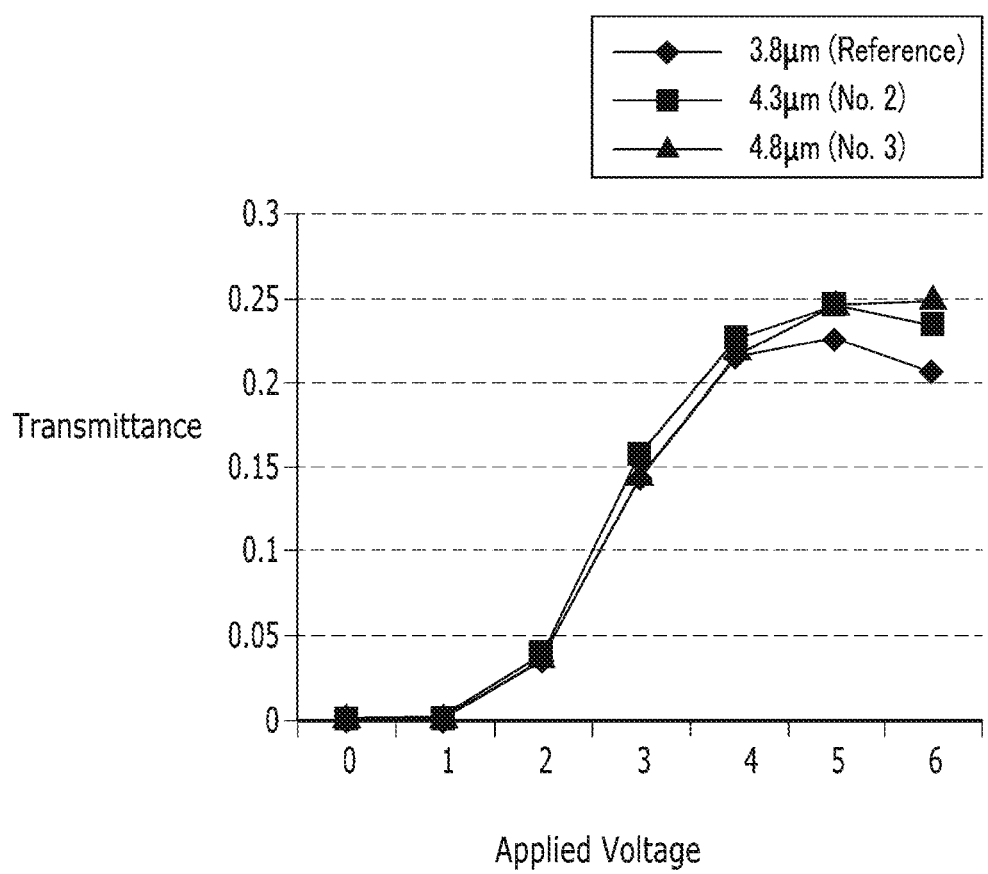
FIG. 12 is a graph illustrating the results of the tests shown in FIG. 11.

FIG. 11A to FIG. 11C illustrate images of the transmittances according to voltages were measured by varying a cell gap in a display device having the same structure as FIG. 6 according to an exemplary embodiment of the present inventive concept. FIG. 12 is a graph illustrating the results of tests shown in FIG. 11.

Referring to FIG. 11 and FIG. 12, it is seen that when the cell gap of the display device in which the groove pattern is formed is increased. Thus, the transmittance of the display device which includes groove pattern may be similar to that in the display device in which no groove pattern is formed. In other words, in the case of the display device according to the exemplary embodiment of the present inventive concept in which the cell gap is 4.8 um, the transmittance at 5 V is 0.25, which is not significantly different from the transmittance according to the comparative embodiment of the present inventive concept shown in FIG. 10.

As described above, the display device according to the exemplary embodiment of the present inventive concept increases the liquid crystal anchoring energy and thus reduces afterimages by forming the groove pattern in which the peak and the valley are repeated at the upper portion of the microcavity. Further, the transmittance reduction caused by the groove pattern is prevented by increasing the cell gap of the display device as compared with the conventional case which does not have the groove pattern.

Figure 13:
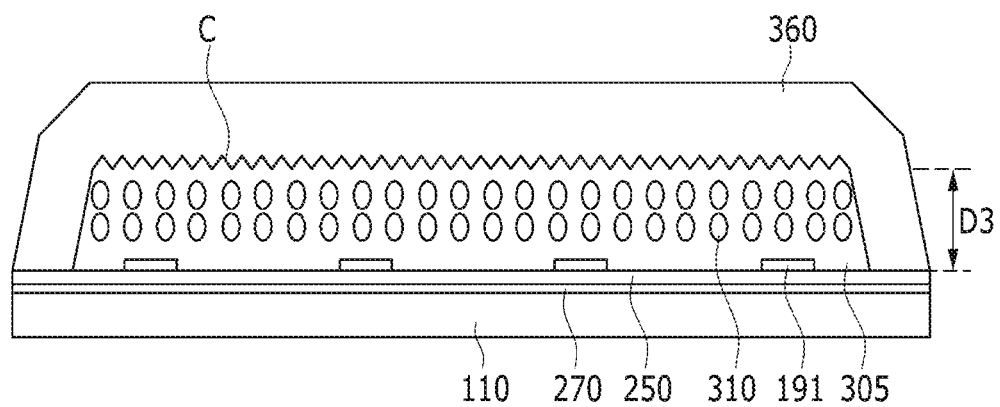
FIG. 13 is a cross-sectional view of a display device according to an exemplary embodiment of the present inventive concept.

Hereinafter, a display device according to an exemplary embodiment of the present inventive concept will be described. FIG. 13 is a cross-sectional view of a display device according to an exemplary embodiment of the present inventive concept. The display device according to the present exemplary embodiment is significantly similar to or the same as that of the aforementioned exemplary embodiment. Detailed description of the similar constituent elements will be omitted.

Referring to FIG. 13, the display device of the present exemplary embodiment is slightly different from that of the aforementioned exemplary embodiment in that a plurality of scratches are formed at the upper portion of the microcavity.

Specifically, as shown in FIG. 13, a plurality of grooves having narrow intervals are formed at the upper portion of the microcavity in an extending direction of the pixel electrode. As a result, a cross-section of the display device is formed to have a pattern in which a plurality of small protrusions and depressions C are formed as shown in FIG. 13.

These individual protrusions and depressions C have the same function and effect as those of the valley A and the peak B of the display device of the aforementioned exemplary embodiment. Specifically, the protrusions and depressions according to the present exemplary embodiment increase the anchoring energy applied to the liquid crystal molecules and compensate a low alignment force of the alignment layer of the display device according to the present exemplary embodiment. Accordingly, it is possible to effectively remove afterimages.

Hereinafter, a manufacturing method of a display device according to each exemplary embodiment of the present inventive concept will be described.

Figure 14:
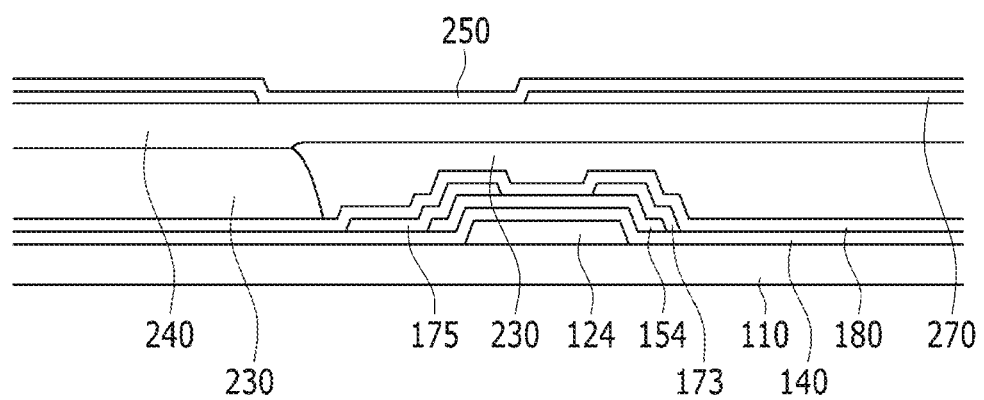
FIGS. 14, 15, 16, 17, 18, 19, 20, 21, 22, 23, 24, 25, 26 and 27 are cross-sectional views illustrating a manufacturing process of a display device according to an exemplary embodiment of the present inventive concept.

First, as illustrated in FIG. 14, a gate line 121 including a gate electrode 124 is formed on an insulation substrate 110, and a gate insulating layer 140 is formed on the gate the line 121. A semiconductor 154, a data line 171 including a source electrode 173, and a drain electrode 175 are formed on the gate insulating layer 140. A passivation layer 180 is formed on the data line 171 and the drain electrode 175.

Next, a color filter 230 is formed on each pixel area PX on the passivation layer 180. Each color filter 230 may be formed on each pixel area PX and may not be formed in the first valley V1. Further, color filters 230 of the same color may be formed along a column direction of the pixel areas PX. When forming the color filters 230 of three colors, the color filter 230 of a first color is formed first and then a mask is shifted to form the color filter 230 of a second color. Next, after forming the color filter 230 of the second color, the mask is shifted to form the color filter of a third color.

Next, an organic layer 240 and a common electrode 270 are formed on the color filter 230, and an insulating layer 250 is formed on the common electrode 270 using an inorganic insulating material such as a silicon nitride (SiNx), a silicon oxide (SiOx), etc.

Subsequently, the passivation layer 180, the color filter 230, and the insulating layer 250 are etched to form a contact hole 184 such that the drain electrode 175 is partially exposed.

Next, a transparent conductive material such as indium tin oxide (ITO), indium zinc oxide (IZO), etc. is deposited and then patterned to form a pixel electrode 191 in the pixel area PX. The pixel electrode 191 is formed to be coupled to the drain electrode 175 through the contact hole 184.

Figure 16:
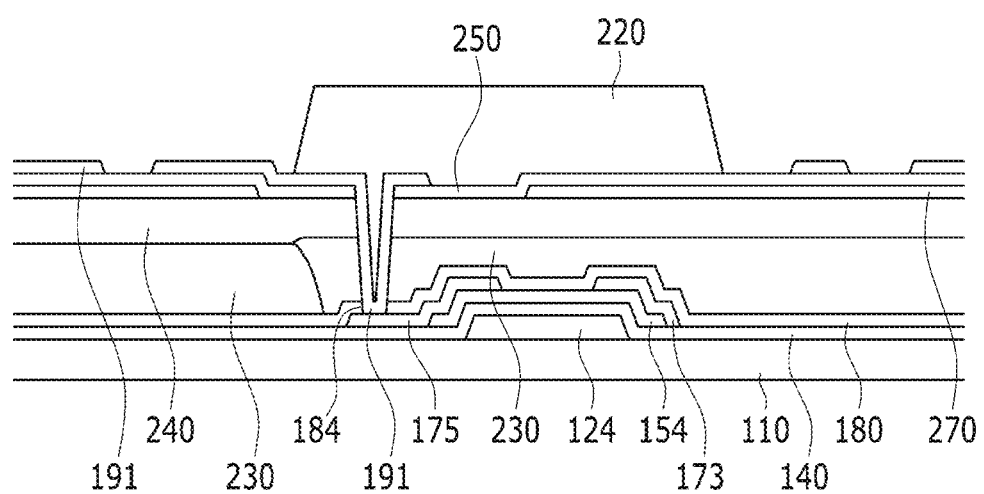

Next, as shown in FIG. 16, a light blocking member 220 is formed on the pixel electrode 191, the insulating layer 250, a boundary of each pixel area PX, and a thin film transistor. That is, the light blocking member 220 may be formed in the first valley V1. Further, the light blocking member 220 may be formed at one edge of each pixel area PX.

It has been described that light blocking member 220 is formed on the color filter 230, but the present inventive concept is not limited thereto, and the color filter 230 may be formed on the light blocking member 220.

Figure 17:
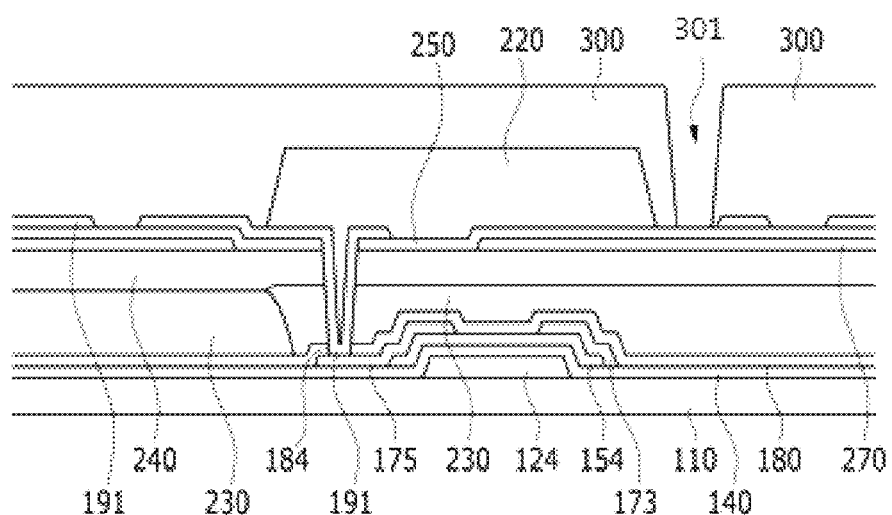

Next, as shown in FIG. 17, a sacrificial layer 300 is formed on the pixel electrode 191 using a photosensitive organic material. The sacrificial layer 300 may be formed by a conventional photolithography process.

The sacrificial layer 300 extends along a plurality of columns. That is, the sacrificial layer 300 at the second valley V2 is removed. Further, an opening 301 is formed by removing a partial region of the sacrificial layer 300 by the photolithography process. The opening 301 may be formed to be adjacent to the first valley V1. The lower insulating layer 350 positioned below the photosensitive organic material is exposed by the formation of the opening 301.

Figure 15:
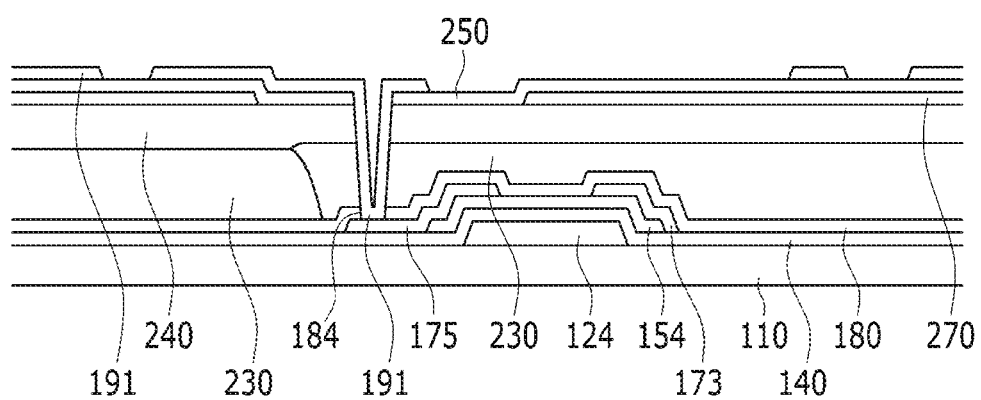

FIG. 15 to FIG. 17 illustrate cross-sectional views of the display device corresponding to the portion as that of FIG. 3. However, hereinafter, the manufacturing process will be described using cross-sectional views of the display device corresponding to the portion as that of FIG. 5.

Figure 18:
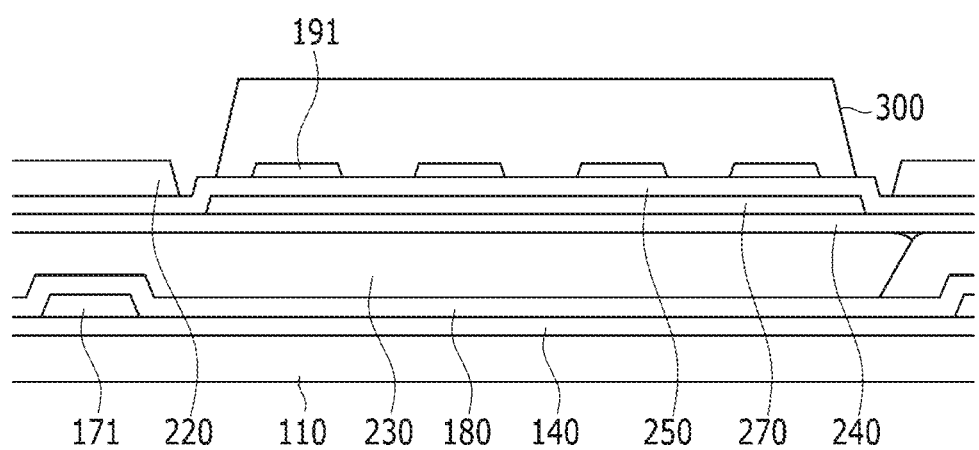
Figure 19:
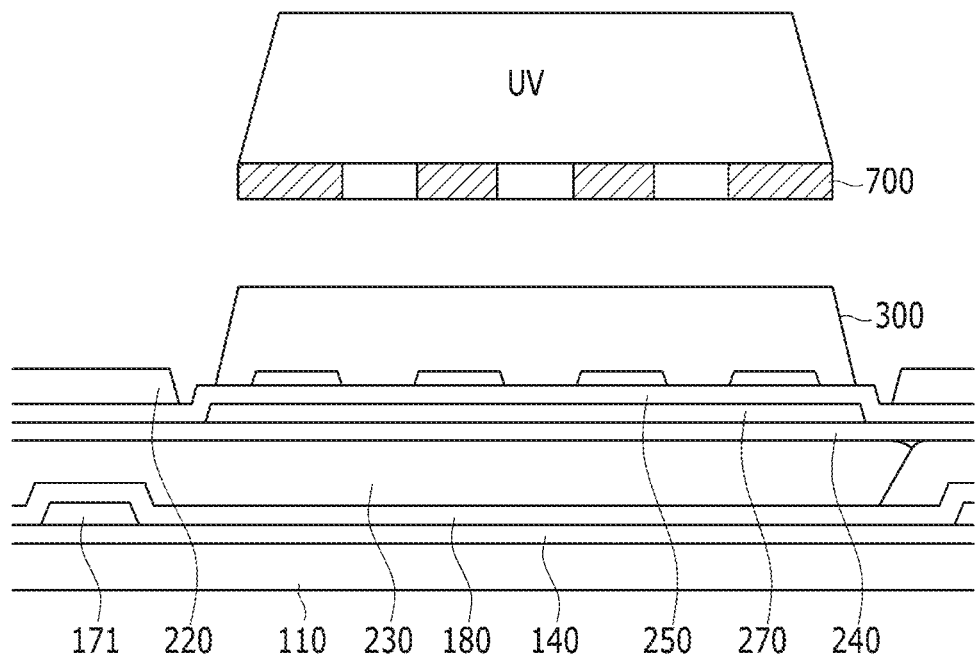

FIG. 18 illustrates a cross-sectional view of the display device after completing steps up to FIG. 17 corresponding to the portion as that of FIG. 5.

Referring to FIG. 18, the sacrificial layer 300 is formed on the pixel electrode 191 by patterning a photosensitive organic material.

Next, ultraviolet (UV) rays are radiated above the sacrificial layer 300 by using a patterned mask 700. Widths of open portions and non-open portions may be varied according to the shape of a groove pattern to be formed. For example, when the groove pattern shown in FIG. 6 and the groove pattern shown in FIG. 7 are formed, the open portions and the non-open portions are opposite to each other.

In this case, the patterned mask 700 and the sacrificial layer are separated from each other by a predetermined distance to perform a UV exposing process. This is because a specific distance is required to accomplish diffraction effect of the UV rays.

Figure 20:
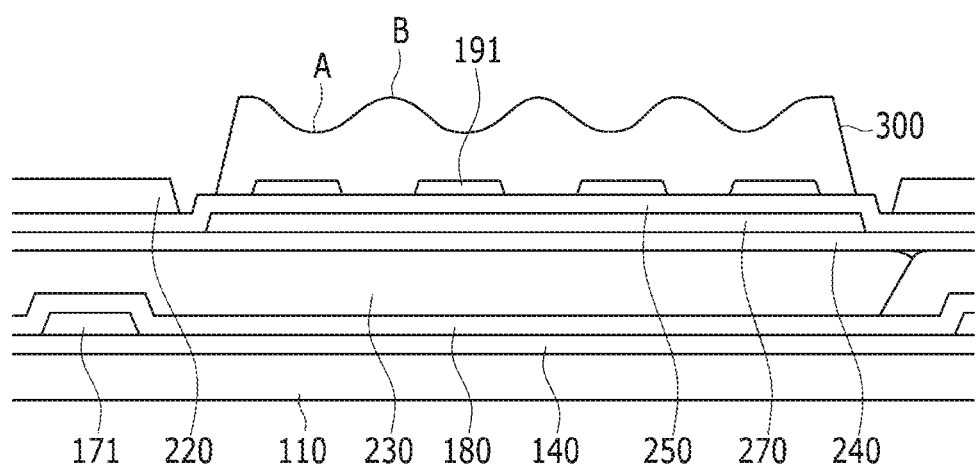

Referring to FIG. 20, a pattern in which the valley A and the peak B are repeated is formed at an upper portion of the sacrificial layer 300 by developing the sacrificial layer 300. The UV diffraction during the UV exposing process helps to form the pattern having the valley A and the peak B. The sacrificial layer 300 is removed later, and a portion at which the sacrificial layer 300 was disposed serves as a microcavity.

Figure 21:
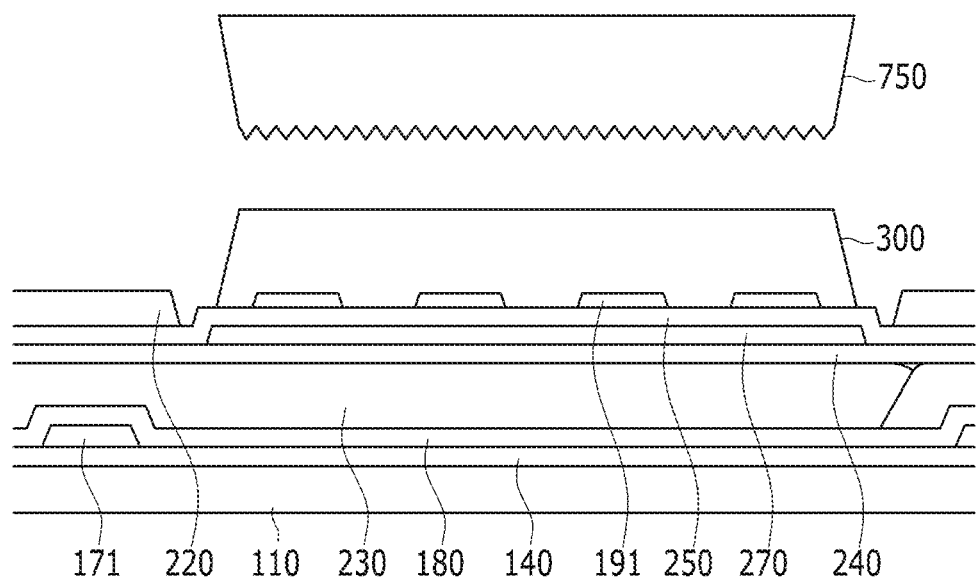

Alternatively, as shown in FIG. 21, a process for physically forming scratches on the sacrificial layer 300 may be performed without aligning the pattern mask 700 above the sacrificial layer 300 and the UV exposing process, after the step of FIG. 18. In FIG. 21, a method of physically scratching a top surface of the sacrificial layer 300 by using a scratcher 750 having a plurality of grooves is shown. However, any method of forming a plurality of grooves having narrow intervals may be employed without being limited thereto.

Figure 22:
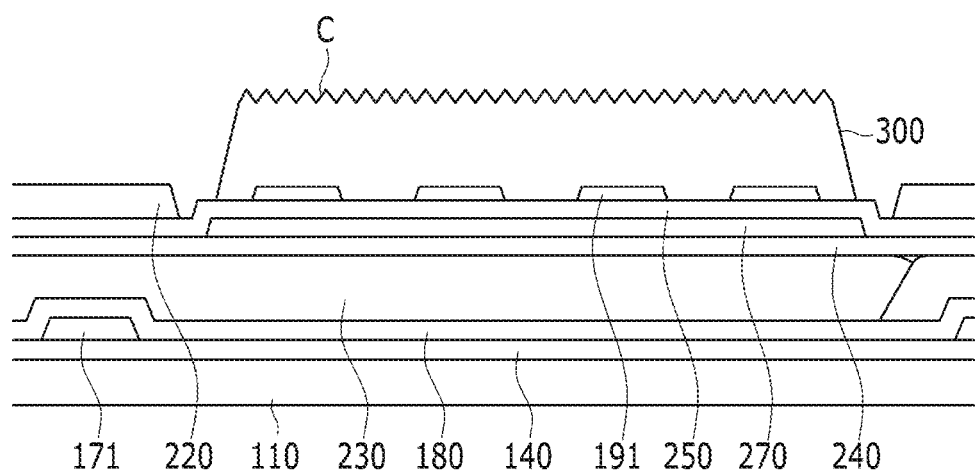

This process may form a plurality of protrusions and depressions at an upper portion of the sacrificial layer 300 as shown in FIG. 22. Through this process, the display device is completed as the display device according to the exemplary embodiment of FIG. 13.

Figure 23:
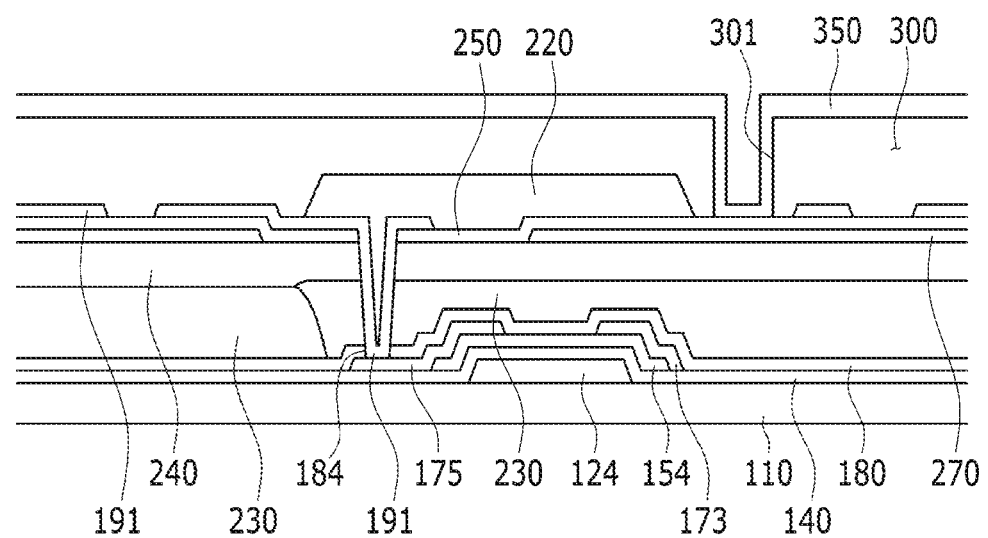

Next, as shown in FIG. 23, a lower insulating layer 350 may be formed on the sacrificial layer 300 using an inorganic insulating material such as a silicon oxide or a silicon nitride. FIG. 23 and the following drawings illustrate cross-sectional view of the display device corresponding to the portion as that of FIG. 3 again.

Figure 24:
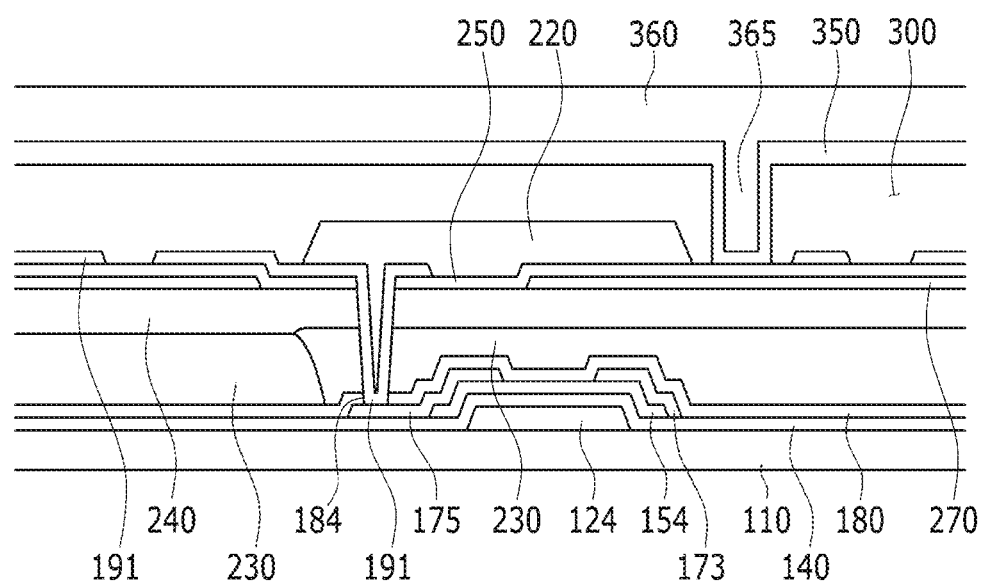

Next, as shown in FIG. 24, the roof layer 360 is formed on the lower insulating layer 350 using an organic material, and the support member 365 is formed in the opening 301. The roof layer 360 and the support member 365 may be formed by using the same material during the same process.

The lower insulating layer 350 may be disposed below the roof layer 360 and the support member 365.

The support member 365 has a pillar shape, and the planar shape of the support member 365 which is viewed from the upper side of the substrate 110 may be various shapes such as a circle, a quadrangle, and a triangle.

Figure 25:
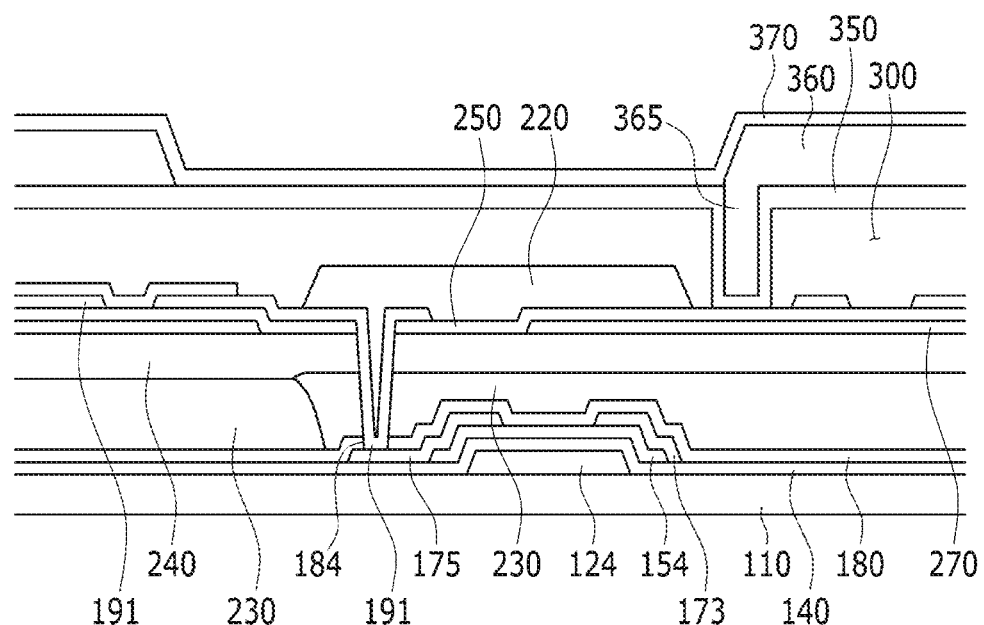

As illustrated in FIG. 25, the roof layer 360 positioned at the first valley V1 may be removed by patterning the roof layer 360. As a result, the roof layers 360 which extend along a plurality of pixel rows may be formed.

Next, an upper insulating layer 370 may be formed on the roof layer 360 with an inorganic insulating material such as a silicon nitride (SiNx) and a silicon oxide (SiOx). The upper insulating layer 370 is formed on the patterned roof layer 360 to cover and protect the side of the roof layer 360.

Figure 26:
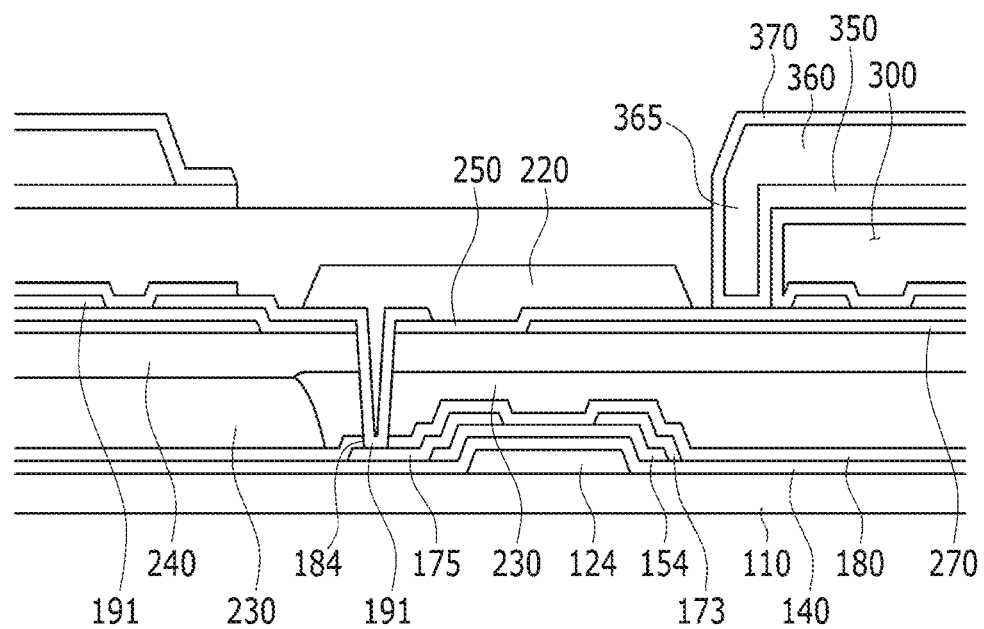

Next, as illustrated in FIG. 26, the upper insulating layer 370 and the lower insulating layer 350 positioned at the first valley V1 are removed by patterning the upper insulating layer 370 and the lower insulating layer 350.

As such, the sacrificial layer 300 positioned at the first valley V1 is exposed to the outside by patterning the upper insulating layer 370 and the lower insulating layer 350.

Next, the sacrificial layer 300 is fully removed by developing or ashing process.

When the sacrificial layer 300 is removed, the microcavity 305 is generated at a region where the sacrificial layer 300 was positioned.

In this case, the microcavity 305 is formed to have a shape that is the same as that of the patterned sacrificial layer. In other words, in the case that the groove pattern in which the valley and the peak are repeated is formed at the upper portion of the sacrificial layer, the microcavity is also formed to have the same groove pattern.

Figure 27:
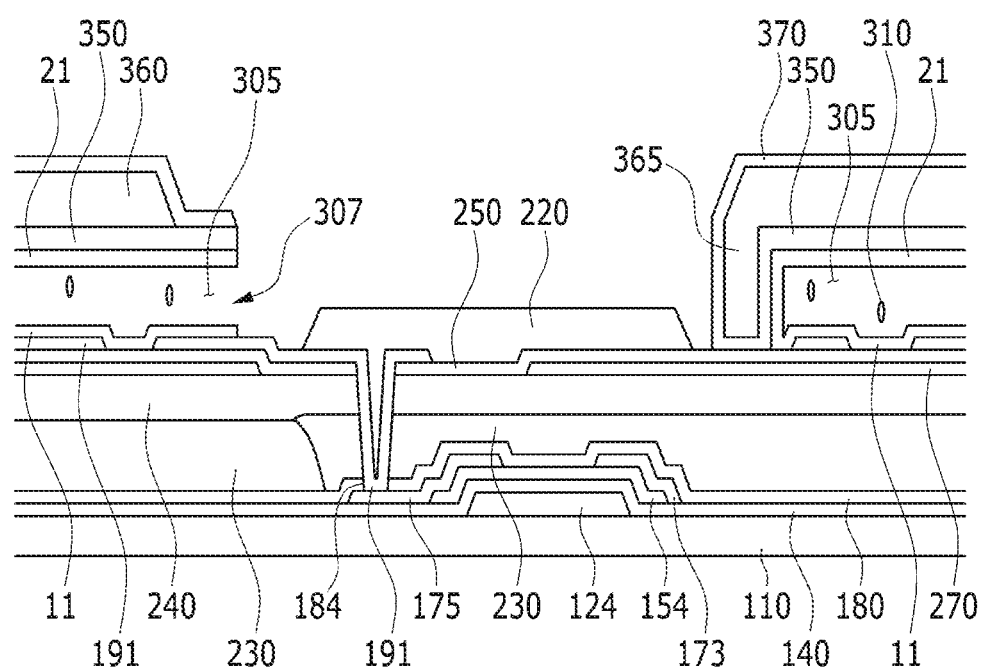

Similarly, in the case that scratches are formed at the upper portion of the sacrificial layer, the microcavity is also formed to have the same scratches. Since FIG. 27 is a cross-section of the display device along a column direction, FIG. 27 does not illustrate the shape of the microcavity well. However, the cross-sections of the display device along the row direction have the shape of the microcavity as shown in FIG. 6, FIG. 7, or FIG. 13.

The pixel electrode 191 and the roof layer 360 are spaced apart from each other with the microcavity 305 therebetween. The roof layer 360 is formed to cover an upper surface and both sides of the microcavity 305, and an opposite surface of the microcavity in which the injection hole is formed.

The microcavity 305 is exposed to the outside through a portion where the roof layer 360 is removed, which is called an injection hole 307. The injection hole 307 may be formed along the first valley V1. For example, the injection hole 307 may be formed at any one of the edges of the pixel area PX. That is, the injection hole 307 may be formed to expose the side of the microcavity 305 which corresponds to the upper edge or the lower edge of the pixel area PX. Alternatively, the injection hole 307 may also be formed along the second valley V2.

Hereinafter, a relative location of the injection hole 307 and the support member 365 will be described.

The support member 365 is formed adjacent to the injection hole 307. One microcavity 305 may have one injection hole 307, and the location of forming the support member 365 is determined by the position of the one injection hole 307. That is, when the injection hole 307 is formed to correspond to the lower edge of the microcavity, the support member 365 may be formed to correspond to the upper edge of the microcavity.

Next, the roof layer 360 is cured by applying heat to the substrate 110. This is to maintain the shape of the microcavity 305 by the roof layer 360.

As illustrated in FIG. 27, when an aligning agent containing an alignment material is dropped on the substrate 110 by a spin coating method or an inkjet method, the aligning agent is injected into the microcavity 305 through the injection hole 307. When the aligning agent is injected into the microcavity 305 and then a curing process is performed, a solvent is evaporated, and the alignment material remains on an inner wall surface of the microcavity 305.

Accordingly, the first alignment layer 11 may be formed on the pixel electrode 191, and the second alignment layer 21 may be formed below the lower insulating layer 350. The first alignment layer 11 and the second alignment layer 21 are formed to face each other with the space therebetween and connected to each other at the edge of the microcavity 305.

The first and second alignment layers 11 and 21 may be initially aligned in a vertical direction which is perpendicular to the substrate 110, except for the side of the microcavity 305. In addition, by performing a process of irradiating UV rays to the first and second alignment layers 11 and 21, the first and second alignment layers 11 and 21 may be aligned in a horizontal direction which is parallel to the substrate 110.

In the case of the display device according to the comparative embodiment of the present inventive concept, it is difficult to accomplish sufficient surface anchoring energy by the photo-alignment process, thereby obtaining poor dynamic characteristics of the liquid crystal molecules which may cause the afterimage.

However, in the display device according to the exemplary embodiment of the present inventive concept, additional surface anchoring energy may be secured by forming the upper portion of the microcavity to have the groove pattern in which the valley and the peak are repeated or to have a plurality of scratches. Accordingly, it is possible to compensate low liquid crystal alignment force caused by the photo-alignment and reduce afterimages.

Next, an overcoat 390 is formed by forming a material which does not react with the liquid crystal molecules 310 on the upper insulating layer 370. The overcoat 390 is formed to cover the injection hole 307 where the microcavity 305 is exposed to the outside to seal the microcavity 305.

Next, although not illustrated, polarizers may be further attached onto the upper and lower surfaces of the display device. The polarizers may be configured by a first polarizer and a second polarizer. The first polarizer may be attached onto the lower surface of the substrate 110, and the second polarizer may be attached onto the overcoat 390.

While this inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

What is claimed is:
1. A display device comprising:
an insulation substrate;
a thin film transistor disposed on the substrate;
a common electrode and a pixel electrode disposed on the thin film transistor to overlap each other with an insulating layer therebetween;
a roof layer formed to be spaced apart from the pixel electrode formed on a pixel area with a microcavity therebetween; and
a liquid crystal layer filling the microcavity,
wherein an upper portion of the microcavity include a valley where a height of the microcavity is reduced and a peak where the height of the microcavity is increased.

2. The display device of claim 1, wherein the pixel area includes a data line and a gate line disposed in a direction that is perpendicular to the data line,
the pixel electrode includes a plurality of cutouts, and
the pixel electrode includes a plurality of branch electrodes formed by the cutouts.

3. The display device of claim 2, wherein the valley includes a plurality of valleys and the peak includes a plurality of peaks,
wherein the plurality of peaks and the plurality of valleys are alternatingly formed along a horizontal direction in which the gate line extends, and
the plurality of peaks or the plurality of valleys extend in a direction parallel to the data line.

4. The display device of claim 3, wherein valleys of the roof layer are formed at positions corresponding to the plurality of branch electrodes, and peaks of the roof layer are formed at positions corresponding to the plurality of cutouts.

5. The display device of claim 3, wherein peaks of the roof layer are formed at positions corresponding to the plurality of branch electrode, and
valleys of the roof layer are formed at positions corresponding to the cutouts.

6. The display device of claim 1, wherein a distance between adjacent peaks of the roof layer is in a range of about 3.5 µm to about 4.5 µm.

7. The display device of claim 1, wherein a distance from a peak to a valley of the roof layer is in a range of about 0.5 µm to about 1.5 µm.

8. The display device of claim 1, wherein a cell gap of the microcavity is in a range of about 3.8 µm to about 4.8 µm.

9. The display device of claim 1, further comprising:
an injection hole disposed at a first end of the roof layer to expose a part of the microcavity; and
an overcoat formed on the roof layer to cover the injection hole and to seal the microcavity,
wherein a support member having a pillar shape is disposed to face the injection hole, and is connected to a second end of the roof layer.

10. The display device of claim 1, wherein a lower portion of the roof layer includes a valley where a thickness of the roof layer is increased and a peak where the thickness of the roof layer is reduced.

11. The display device of claim 10, wherein an upper portion of the roof layer has a flat surface.

12. The display device of claim 1, wherein the roof layer includes a supporting member.

13. The display device of claim 12, wherein the supporting member is formed to face an injection hole through which the liquid crystal layer is injected.

* * * * *